June 2, 1953

F. G. KEYES 2,640,332

OXYGEN PRODUCING APPARATUS

Filed Aug. 10, 1946

Inventor
Frederick G. Keyes
by Harry Dexter Peck
Attorney

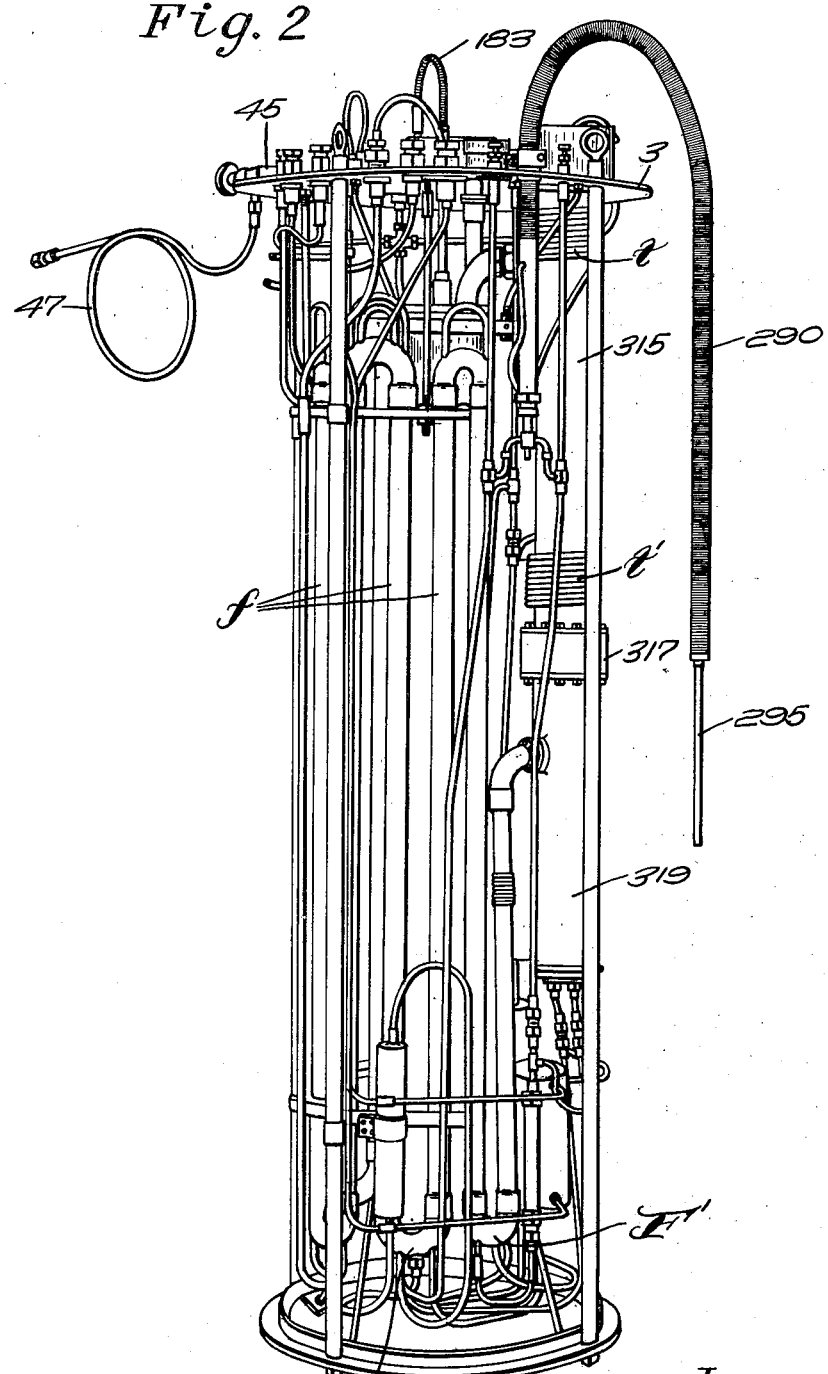

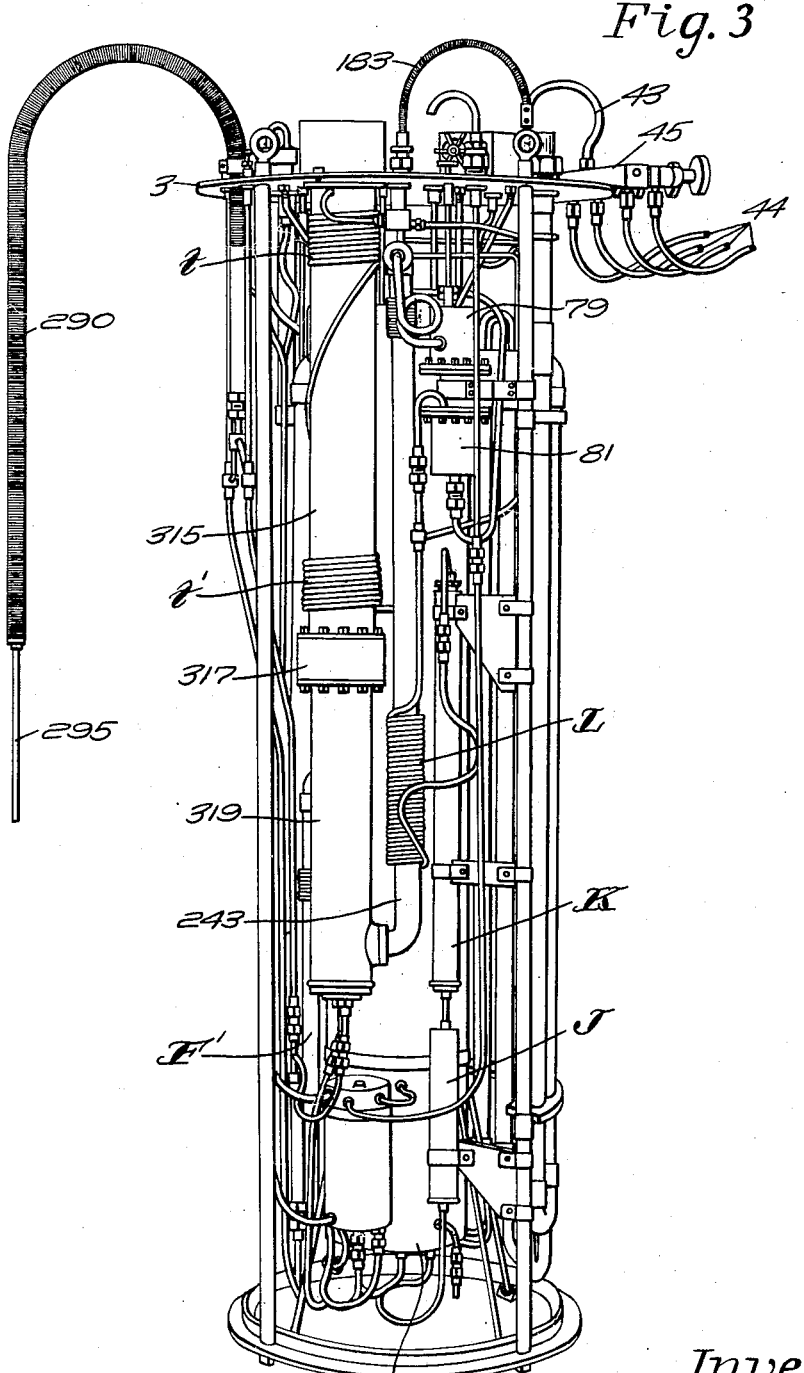

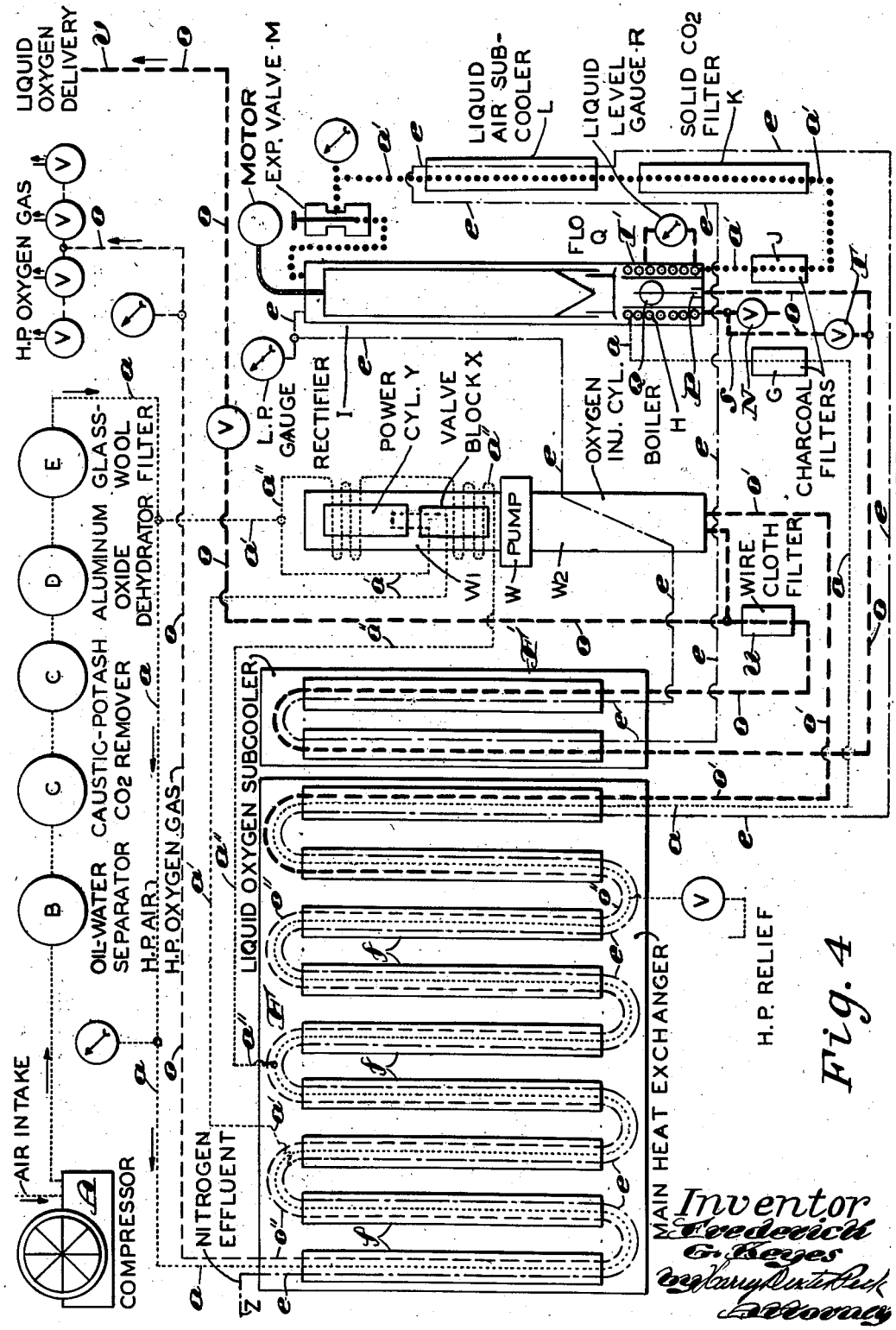

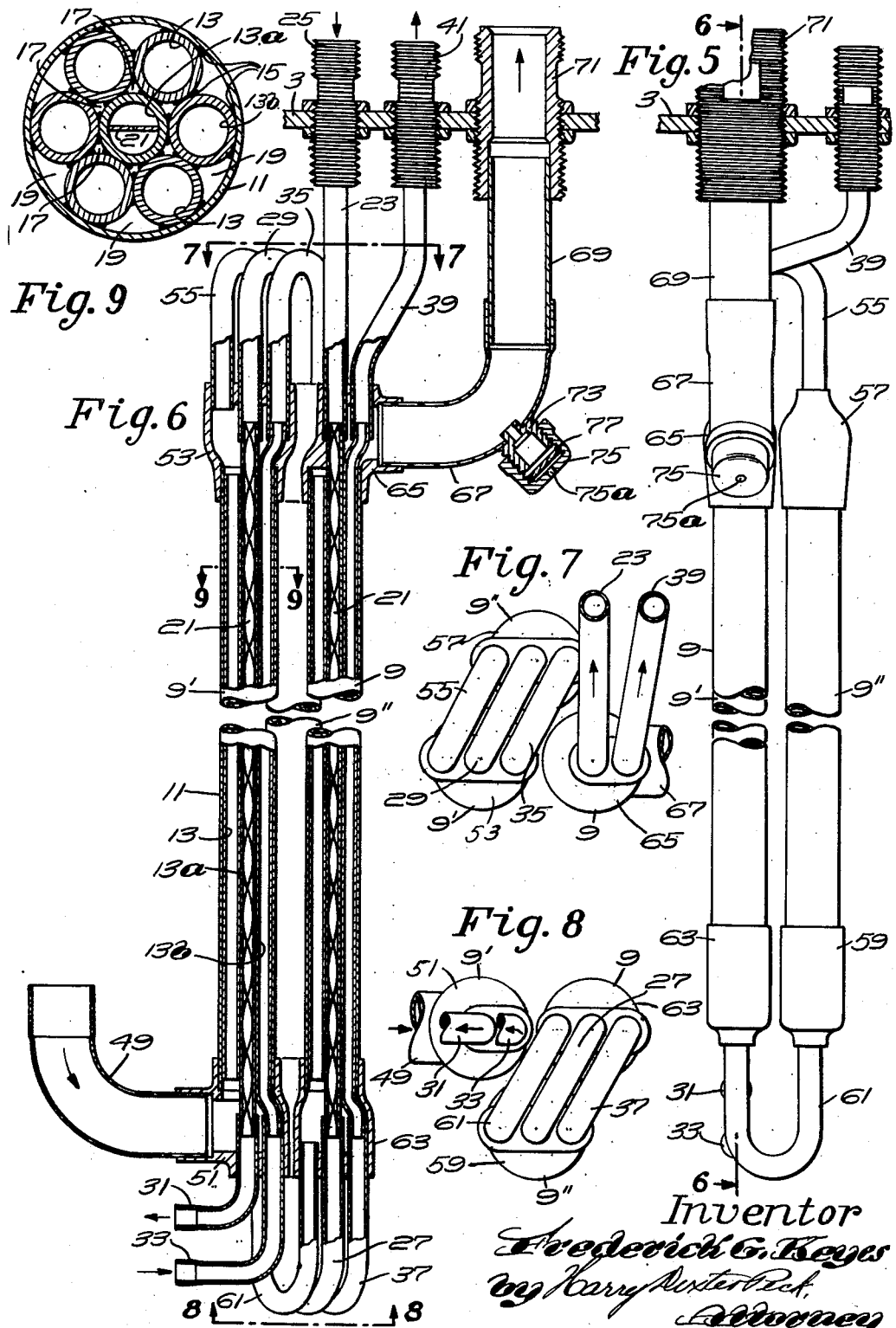

June 2, 1953  F. G. KEYES  2,640,332
OXYGEN PRODUCING APPARATUS
Filed Aug. 10, 1946  13 Sheets-Sheet 6
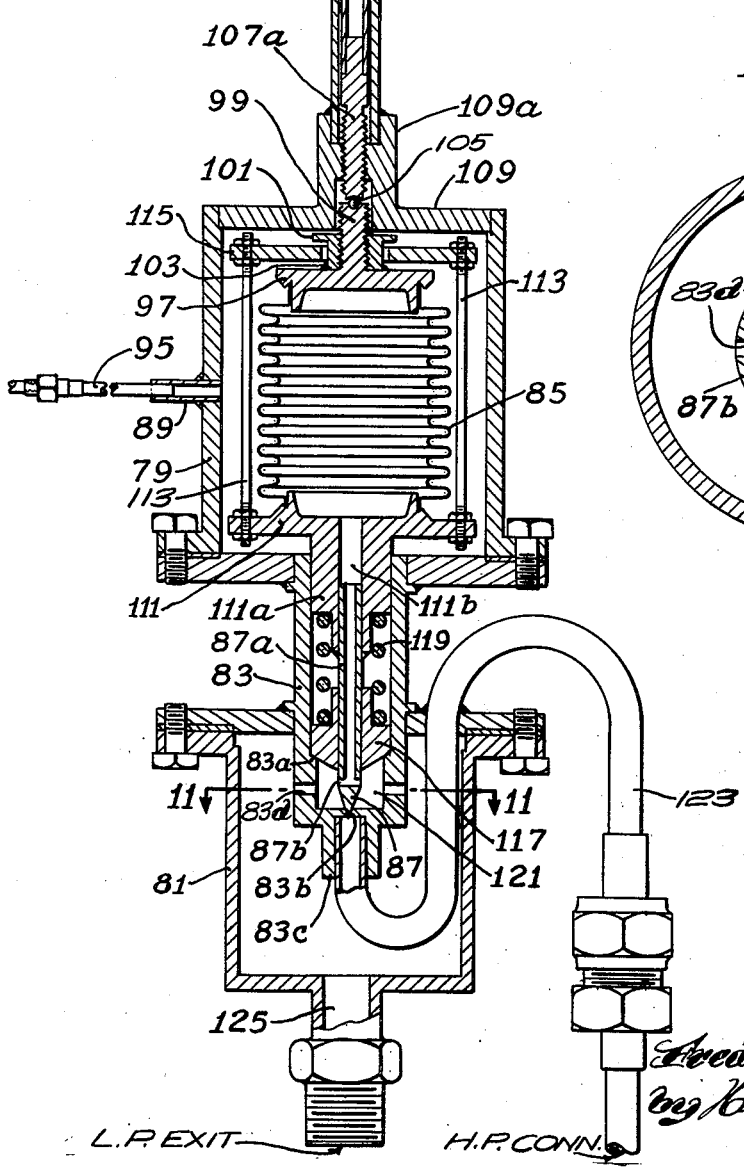
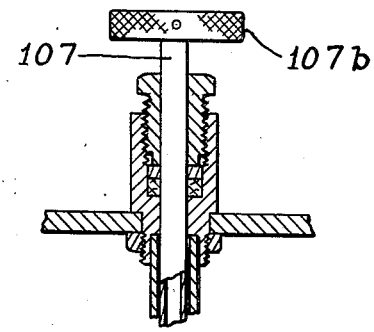
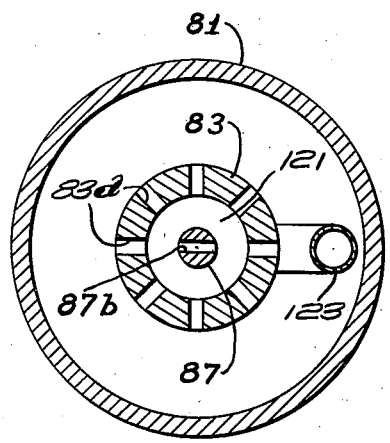
Inventor
Frederick G. Keyes
by Harry Austin Reed
Attorney June 2, 1953     F. G. KEYES     2,640,332
OXYGEN PRODUCING APPARATUS
Filed Aug. 10, 1946     13 Sheets-Sheet 7
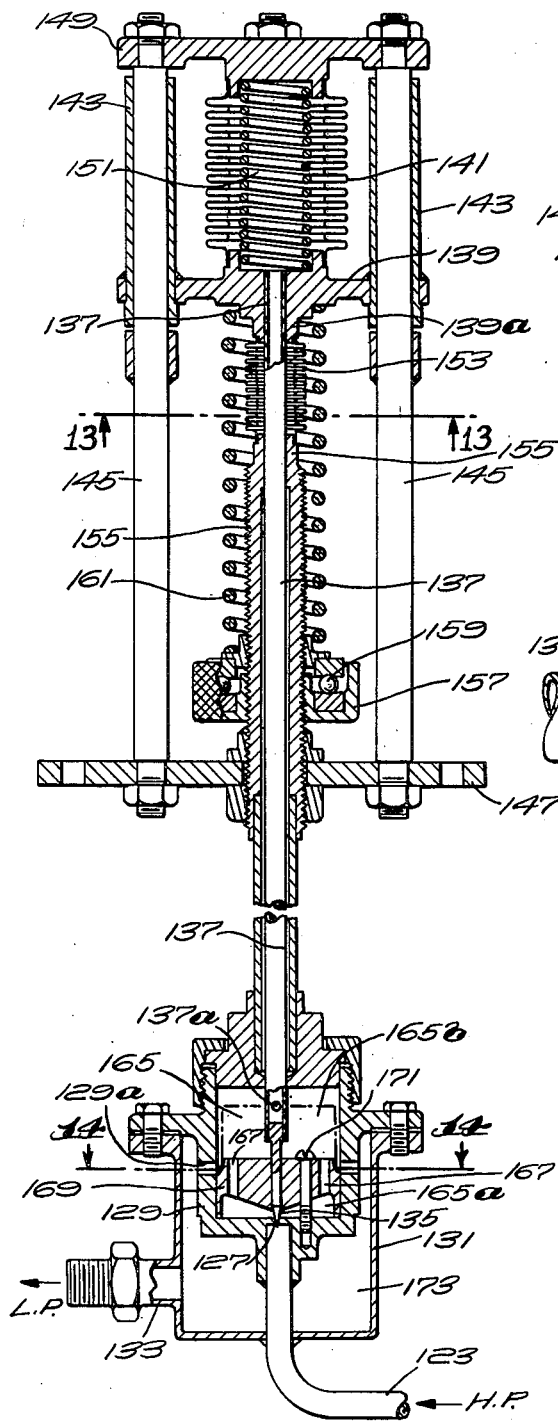
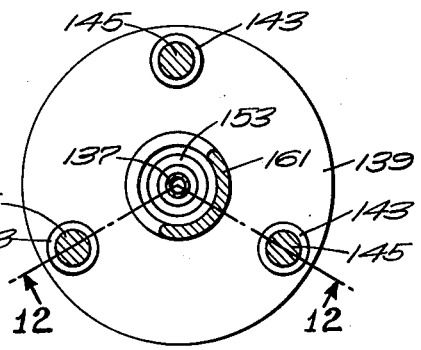
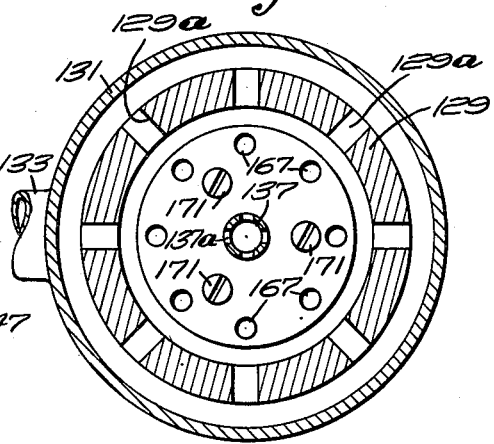
Inventor
Frederick G. Keyes
by Harry Axter Pick
Attorney June 2, 1953 F. G. KEYES 2,640,332
OXYGEN PRODUCING APPARATUS
Filed Aug. 10, 1946 13 Sheets-Sheet 8

Inventor
Frederick G. Keyes
by Harry Dixterfied
Attorney

June 2, 1953     F. G. KEYES     2,640,332
OXYGEN PRODUCING APPARATUS
Filed Aug. 10, 1946     13 Sheets-Sheet 9
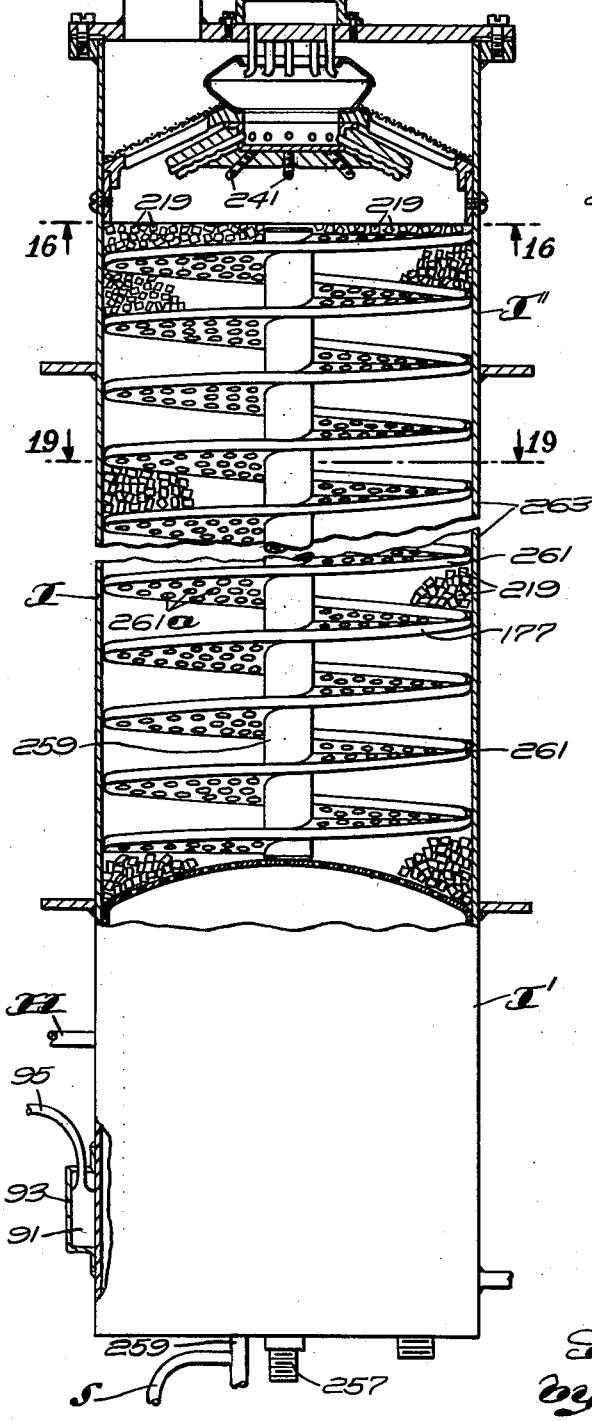
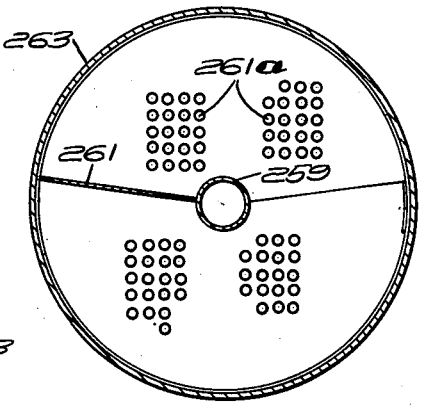
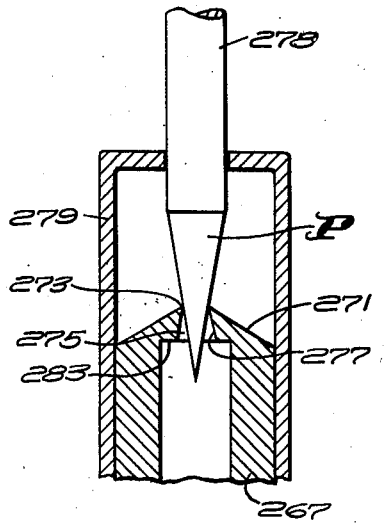
Inventor
Frederick G. Keyes June 2, 1953
F. G. KEYES
2,640,332
OXYGEN PRODUCING APPARATUS
Filed Aug. 10, 1946
13 Sheets-Sheet 10
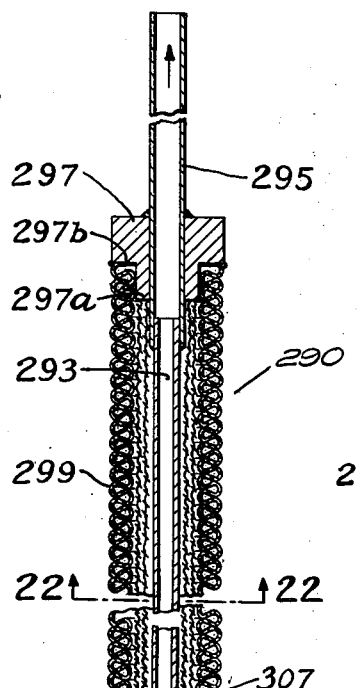
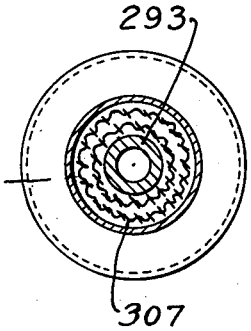
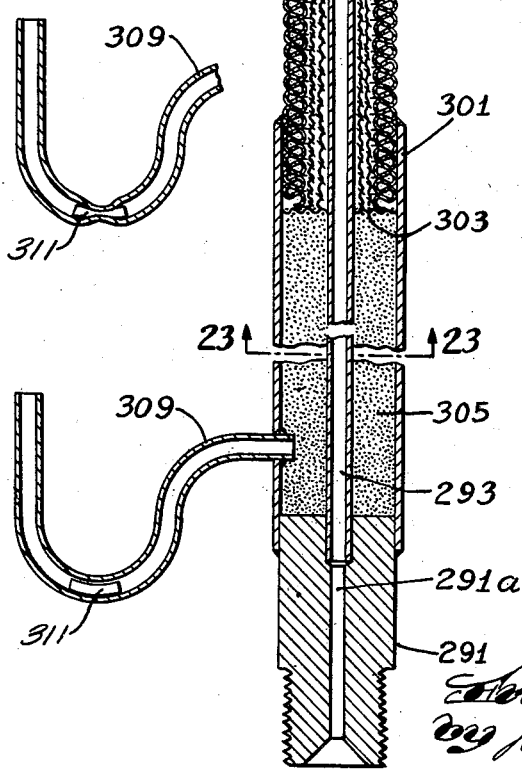
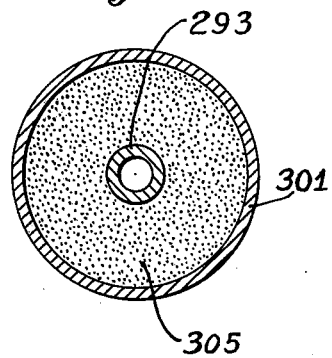
Inventor
Frederick G. Keyes
by Harry Dexter Reed
Attorney

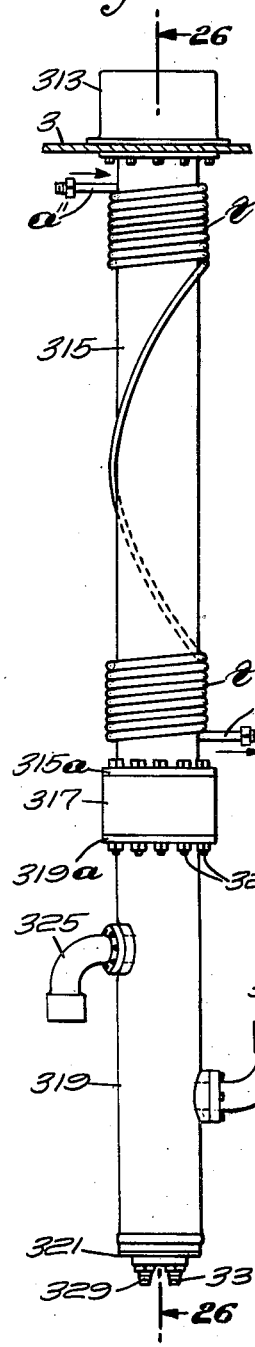
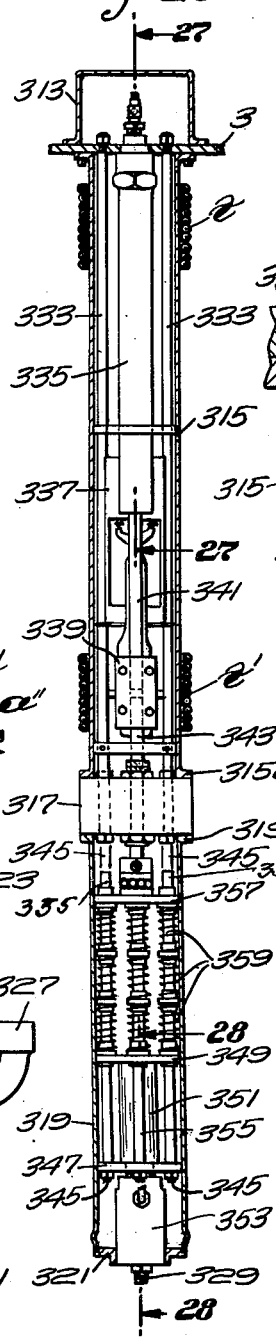
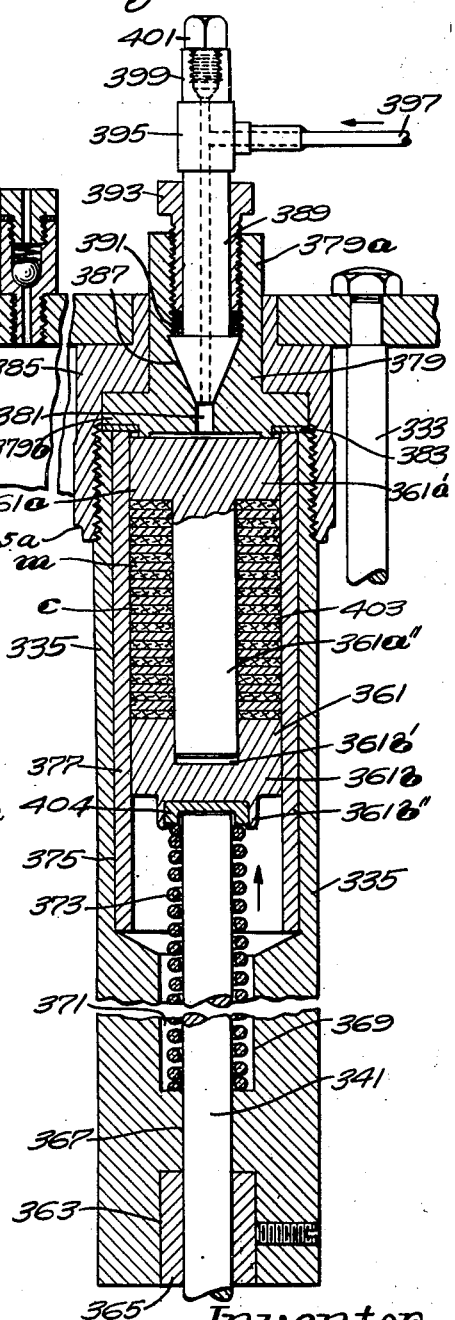

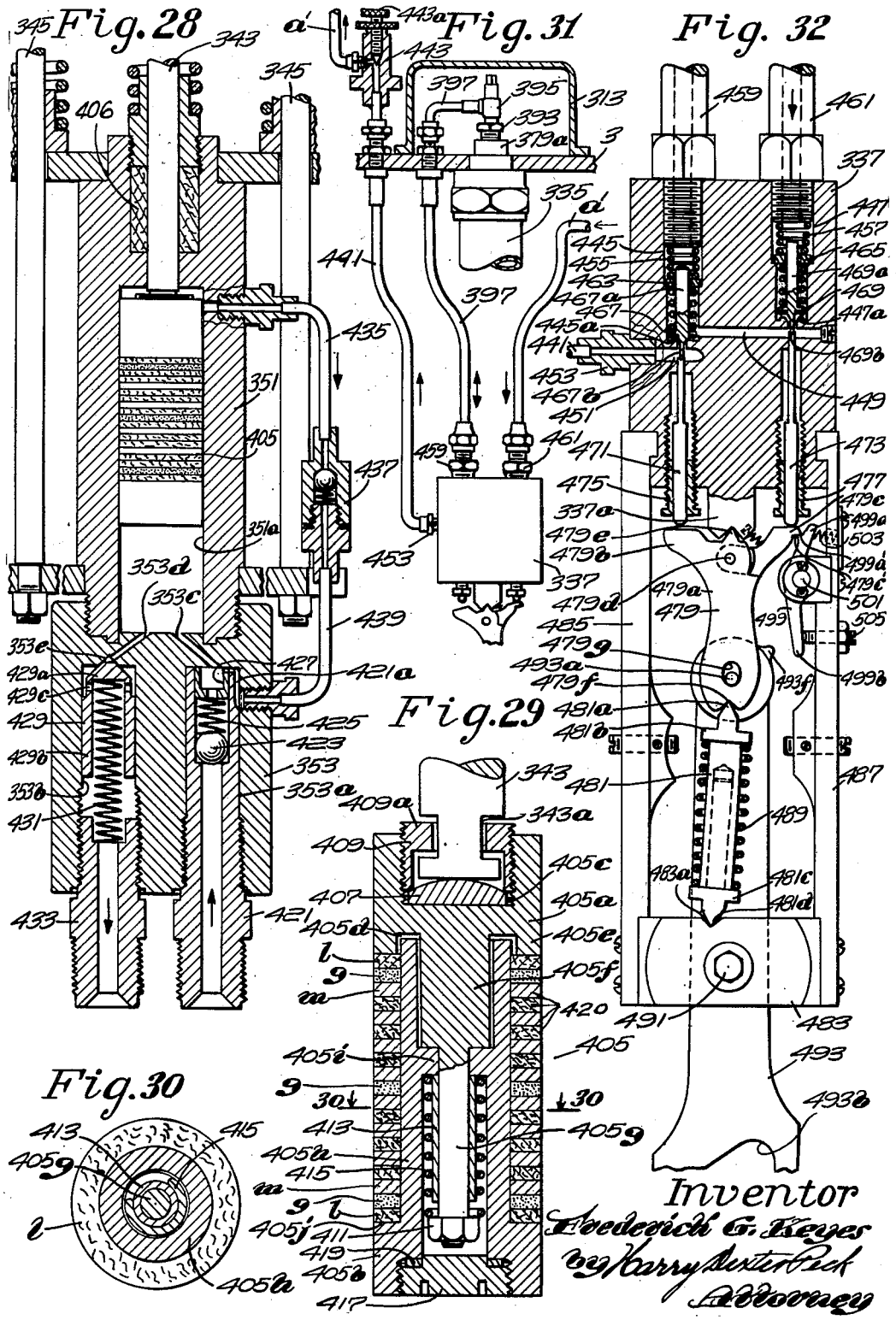

June 2, 1953  F. G. KEYES  2,640,332
OXYGEN PRODUCING APPARATUS
Filed Aug. 10, 1946  13 Sheets-Sheet 13
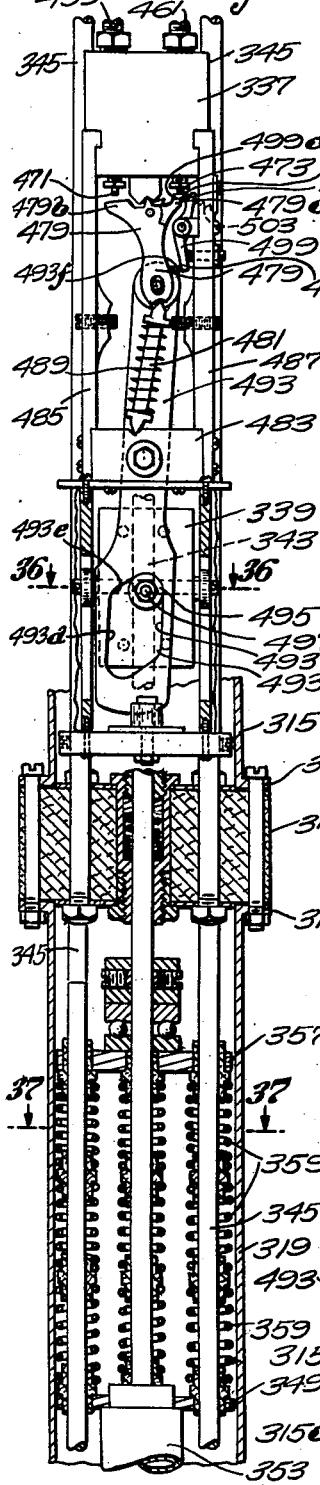
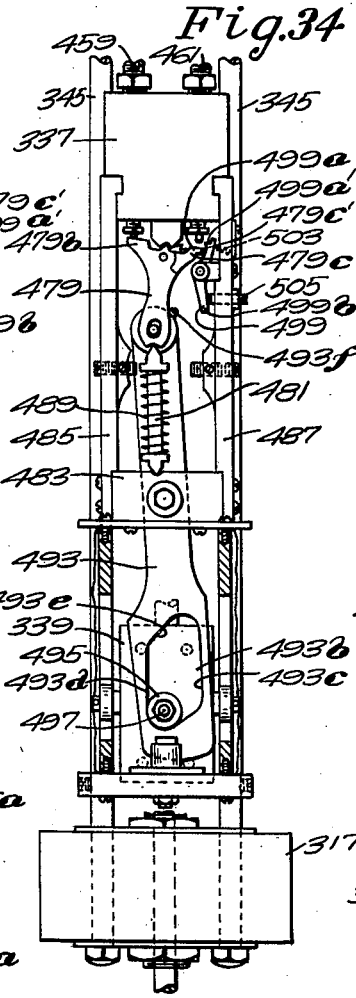
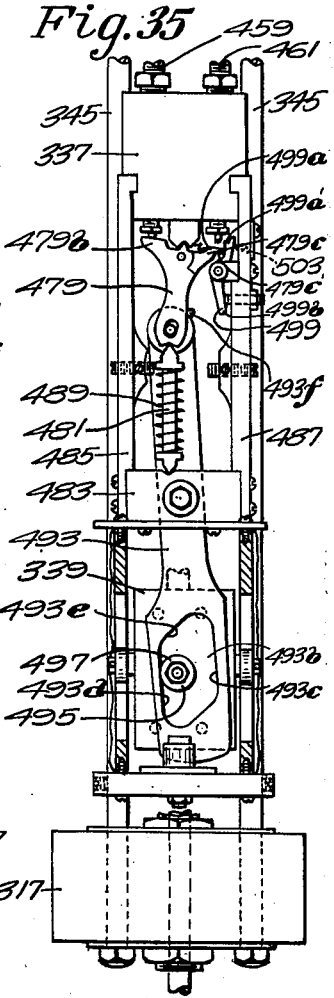
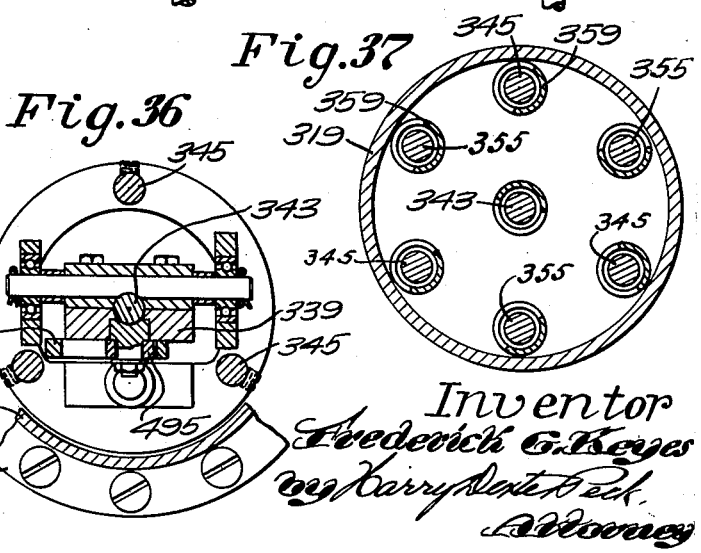
Inventor
Frederick G. Keyes
by Harry Dexter Beck
Attorney Patented June 2, 1953

2,640,332

UNITED STATES PATENT OFFICE 2,640,332

OXYGEN PRODUCING APPARATUS

Frederick G. Keyes, Cambridge, Mass., assignor, by mesne assignments, to Arthur D. Little, Inc., Cambridge, Mass., a corporation of Massachusetts Application August 10, 1946, Serial No. 689,768

16 Claims. (Cl. 62—122)

This invention relates to improvements in oxygen producing apparatus. More especially it has to do with the provision of a highly efficient and exceedingly compact unit for producing oxygen from atmospheric air.

In general the process follows the so-called Linde method of compressing air to a high pressure, cooling it at this pressure and then expanding it to a low pressure to produce liquid air. The latter is then separated into liquid oxygen and the remaining constituents, the most important of which are nitrogen and argon. The liquid oxygen can be delivered from the apparatus into suitable containers but the apparatus more particularly provides for transforming it into high pressure oxygen gas which can be discharged directly into the usual portable cylinders. If desired both the liquid oxygen and the oxygen gas may be piped from the improved producing apparatus to the place of immediate use.

Heretofore in the practice of the Linde method, the apparatus employed has been an established plant of considerable size. It is a principal object of this invention to provide a relatively small compact unit which can be placed on vehicles such as ships, trucks, aircraft and railway cars, or which can be readily moved about industrial plants, laboratories and the like to whatever location is most convenient to the user of the oxygen. In attaining this easily portable unit numerous improvements in various elements of the apparatus have been made and novel methods have been developed.

The best mode in which the principles of the present invention have been applied is shown in the accompanying drawings, but these are to be deemed merely illustrative for it is intended that the patent shall cover by suitable expression in the appended claims whatever features of patentable novelty exist in the improvements as a whole.

In the accompanying drawings:

Fig. 2 is an elevation of the apparatus alone with its cylindrical casing and insulating material removed;

Fig. 3 is another elevation like Fig. 2, but taken from substantially the opposite side;

Fig. 4 is a diagrammatic representation of the apparatus showing the courses of flow of the liquids and gases through the numerous elements;

Fig. 5 is an elevation of a unit section of a preferred form of heat exchanger;

Fig. 6 is a vertical section of the same, taken as on line 6—6 of Fig. 5;

Fig. 7 is a top view taken on line 7—7 of Fig. 6;

Fig. 8 is a bottom view taken as on line 8—8 of Fig. 6;

Fig. 9 is a somewhat enlarged horizontal section, taken as on line 9—9 of Fig. 6, showing the multi-tube arrangement in a column of the heat exchanger;

Fig. 10 is a vertical medial section showing an automatic expansion valve;

Fig. 11 is an enlarged horizontal section taken as on line 11—11 of Fig. 10;

Fig. 12 is a medial vertical section through a modified automatic expansion valve;

Fig. 13 is a horizontal section, looking upward, taken as on line 13—13 of Fig. 12;

Fig. 14 is an enlarged horizontal section taken as on line 14—14 of Fig. 12;

Fig. 18 is an elevation of another form of rectifier column with part of the casing in section to show a stationary spiral distributor in full view;

Fig. 19 is a cross section through the rectifier casing and the spiral deflector, taken as on line 19—19 of Fig. 18;

Fig. 20 is an enlarged view of a valve with its seat shown in medial section;

Fig. 21 is a medial section of a vacuum jacketed flexible metal hose for the delivery of liquid oxygen;

Fig. 22 is a sectional view of the same, taken as on line 22—22 of Fig. 21;

Fig. 23 is another horizontal view taken as on line 23—23 of Fig. 21;

Fig. 24 is a vertical section, showing the exhaust tube sealed;

Fig. 25 is an elevation of the pump element;

Fig. 26 is an elevation partly in section on line 26—26 of Fig. 25;

Fig. 27 is a medial vertical section on line 27—27 of Fig. 26 showing details of the driving end of the pump assembly;

Fig. 28 is a similar medial section on line 28—28 of Fig. 26 showing the oxygen end of the pump;

Fig. 29 is a medial vertical section of the oxygen plunger;

Fig. 30 is a horizontal section taken as on line 30—30 of Fig. 29;

Fig. 31 is a diagrammatic elevation showing the fluid connections to the valve block of the pump;

Fig. 32 is a medial vertical section of the valve block, with some of the valve mechanism in full elevation;

Fig. 33 is an elevation of the valve mechanism at the beginning of the power stroke of the pump, and a medial sectional view of certain details below the valve mechanism;

Fig. 34 is a similar view of the valve mechanism at the end of the power stroke;

Fig. 35 is another view of the valve mechanism during the exhaust stroke;

Fig. 36 is a sectional view taken as on line 36—36 of Fig. 33; and

Fig. 37 is a horizontal section taken on line 37—37 of Fig. 33.

Figure 1:
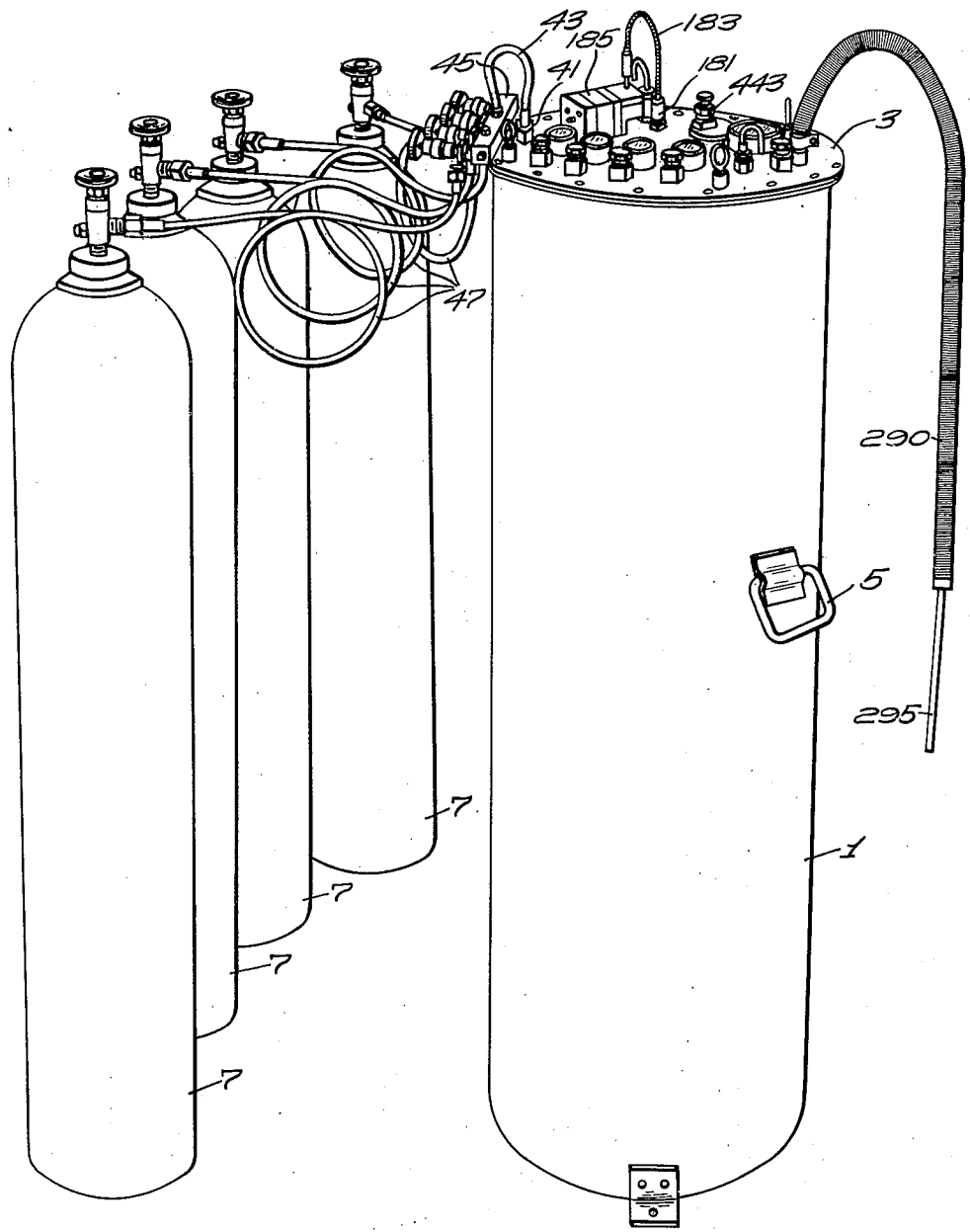
Fig. 1 is a perspective showing the oxygen producing apparatus connected to several cylinders for holding the high pressure gas.

Referring now more particularly to the drawings, and especially to Figs. 1, 2 and 3, the improved apparatus for producing oxygen, either as a liquid or as a high pressure gas, or both, is extremely compact. It is completely housed within a small cylindrical container 1, on the top cover 3 of which are various gauges, control and connection means. The unit can be readily lifted manually by aid of handles 5 and may be used wherever desired, either in a stationary location or upon a vehicle. This remarkable compactness results from an effective arrangement of the essential elements in intimate relation and from the employment of certain novel elements and methods particularly conceived for the purpose of saving space and producing highly efficient operation. Before considering the particular elements and the details making up the improved apparatus, it might be well to describe the overall arrangement by reference to the diagrammatic layout of Fig. 4.

Atmospheric air is compressed to a high pressure by any suitable compressor A and passed through a clean-up train which may comprise an oil and liquid water separator B, one or more caustic potash carbon dioxide removers C, an aluminum oxide dehydrator D, and a glass wool filter E. This train is no part of the improved unit, and other clean-up means could be employed instead of those suggested, provided that the air is made as completely free as possible of hydrocarbon vapor from oil of compressor, carbon dioxide, liquid water and water vapor. This highly compressed clean air (indicated by the light dotted line a) may all be used for the production of oxygen, but when gaseous oxygen is to be delivered by the apparatus it is a feature that a portion of the compressed air can be utilized to actuate a pump to be hereinafter described. This use of the air as a source of power is not essential because other means, if desired, could be relied upon to drive the pump. This pump driving air can be exhausted to the atmosphere but as herein shown it is led into the effluent stream. Another portion of the air supply is employed in connection with the pump to retain some of the refrigeration that might otherwise be lost. This portion of the air is returned to the air stream and utilized in the production of the oxygen.

The air, except as above noted, is conducted through a main heat exchanger F made up of a series of unit sections f intimately arranged and so connected that the flow from the bottom of one section enters the bottom of the next adjacent section while the flow from the top of one similarly enters the top of the next. As the compressed air travels its course through a passageway of this main heat exchanger F much of its heat is transferred to the cooler effluent and oxygen which simultaneously is passing through other and separated passageways of the exchanger, as will presently appear.

The cooled air from the main exchanger F passes thence through a charcoal adsorber G and into a coil of tubing H the turns of which are suitably spaced to allow for the free circulation of the boiling oxygen-rich liquid which is not permitted to exceed a desired level in the bottom portion I', or so-called boiler, of a rectifier column I. The upper portion of this column is generally referred to as the distributor. During the passage of the air through this tubing H the heat transfer from it to the surrounding bath of oxygen-rich liquid causes the air to be transformed from the gaseous to the liquid state under the pressure of the air feed. The liquid air (indicated by the heavy dotted line $a'$) issuing from the boiler coil H passes through a charcoal trap J and, preferably, a solid carbon dioxide filter K. It is a feature of the invention that the liquid air is then passed through another heat exchanger L, hereinafter called a liquid air sub-cooler, which further reduces its temperature. Up to this point in its course of travel the air has been almost continuously giving up heat and therefore arrives at the discharge end of the sub-cooler at a very low temperature.

The liquid air next goes through an expansion valve M and is immediately led into the top of the rectifier column I, above the distributor. While the expansion greatly reduces the pressure of the liquid air only a small portion of it changes back to the gaseous state because of its exceedingly low temperature. For the most part the liquid air flows downward through the rectifier entering into mass exchange with vapors having their origin in the boiler and rising upward through the column. In this process the liquid air is deprived of its nitrogen and part of the argon along with other rare gases which rise to the top of the column, join with whatever gaseous air may be present, and pass off from the rectifier along a course presently to be described. The remaining liquid continues downward into the bottom of the rectifier to maintain about the coil H a bath of nearly pure liquid oxygen.

This liquid oxygen (indicated by the heavy dash line o) may be drained from the bottom of the rectifier via a drain valve N when desired, but ordinarily the drain is closed and the flow of oxygen from the boiler is by way of valve P under control of a float Q. The latter automatically maintains the liquid oxygen at a predetermined level which can be indicated by a gauge R placed at any desired location, in this instance on the cover 3 of the unit container 1.

If, for any reason this valve P should be unable to pass all the liquid oxygen produced, another line S, connected to the bottom of the boiler and thence with the line from the valve P, can be opened by means of the valve T which is normally closed.

The liquid oxygen passing the float valve P, and such as passes through the line S when open, flows through a sub-cooler F' comprising unit sections similar to those making up the main heat exchanger F. From the sub-cooler F' the liquid oxygen goes through a wire cloth filter U, and may then be delivered from the apparatus through an outlet V. If only liquid oxygen is to be produced, the described course of the oxygen would be its complete course and the high pressure pump W, about to be described, could be omitted. When gaseous oxygen is to be a product of the apparatus, then the liquid oxygen follows a different course beyond the filter U.

The liquid oxygen after it flows through the sub-cooler F' and the wire cloth filter U is led to a novel pump W which transforms the relative low pressure liquid oxygen into high pressure liquid oxygen. The high pressure oxygen (indicated by the heavy dash line o') delivered by the pump W is caused to traverse the main heat exchanger F hereinbefore mentioned, through which most of the incoming compressed air is flowing. Heat is absorbed by the liquid oxygen, thus raising its temperature and causing it to be transformed into high pressure oxygen gas (indicated by the thin dash line o''). When it finally leaves the heat exchanger it is at the proper temperature and pressure to be delivered into the customary cylinders 7 (Fig. 1) for transportation to its ultimate place of use. If the oxygen gas is needed as produced, as for example if the gas is to be used in a sealed cabin of a high flying airplane or within compartments of a submarine, it can be discharged directly from the unit through a suitable pressure reducing valve (not shown) instead of into the customary portable containers.

The oxygen pump as herein disclosed, and as will be more particularly described later, has a cylinder and plunger at one end for highly compressing the liquid oxygen and at its other end has another cylinder and piston to which force is applied to actuate the oxygen plunger. This force, as previously noted, may conveniently be supplied by the compressed air, a portion of which is taken from the main line and led as at a' to a valve block X and thence to and from the power cylinder Y of the pump. After being used there the air may be exhausted from the valve block to atmosphere, but in the particular apparatus being described it is led into the effluent passage of the main heat exchanger.

The compressed air is also used as a thermal agent in connection with the driving end of the pump. A tube a'' leads from the branch a' to the upper casing $W_1$ of the pump and is there coiled a few turns about the outside of the casing. The tube then extends to the lower end of the same upper casing $W_1$ where it is likewise coiled a few times about the surface of the casing. Thence the tube is connected to the air passage at some intermediate point in the main heat exchanger. As will be more particularly described later herein, this use of the air in the coils about the upper casing of the pump improves the thermal conditions in the power or driving end of the pump, and saves refrigeration that otherwise would be lost from the oxygen end of the pump.

Going back now to where it was noted that the effluent rises in the rectifier column I, it remains to point out how effective use can be made of this effluent for cooling purposes. The effluent (indicated by the dot-and-dash line e) is first led from the top of the rectifier to the lower casing $W_2$ of the pump W and serves to keep the temperature within this casing low so there will be no conversion of the liquid oxygen into gas during the intake stroke of the oxygen plunger. The compressing of the liquid oxygen increases its temperature and the cold effluent within the casing $W_2$ also removes this heat, a necessary item to prevent "vapor lock."

From the casing the effluent flows next through the sub-cooler F' for the liquid oxygen and thence passes through the sub-cooler L for the liquid air on its way from the boiler H to the expansion valve M. Lastly the effluent passes to and through the main heat exchanger F, absorbing heat from the incoming compressed air, and is finally vented to atmosphere at Z.

The courses of flow of the air, oxygen and effluent are so arranged as to effect a desired and highly efficient exchange of heat to the end that oxygen will be produced by the apparatus as desired. Gaseous oxygen can be delivered at substantially room temperature and at the proper pressure for loading the standard storage cylinders. Also, and alternatively if desired, liquid oxygen may be collected and stored in suitable containers which currently may be purchased on the open market.

Several elements of the complete apparatus will now be described in detail.

The heat exchangers

Where high pressure gases are in heat interchange relation with low pressure gases, a condition of exaggerated heat transmission unbalance is present. There is also an inherent unbalance of heat capacity and in certain instances, as for example where liquid oxygen is produced, there is an additional unbalance of mass or weight flow per unit of time for the different fluid streams. High pressure gas has a higher heat capacity and a much larger heat transfer coefficient than has low pressure gas. Here, in the improved apparatus for producing oxygen gas, there is the problem of heat exchange between the air at a high degree of compression and the effluent at a relatively very low pressure. In addition there is the matter of pressure drop for the fluids flowing through their respective passages. For fluids, gases in the present instance, assuming the same mass flow rates for the same gas differing only in pressure but flowing in separate circular section channels of the same cross-section, the pressure drops will be inversely proportional to the pressures or to the densities of the gases in their respective channels. The resistance to flow for a unit of mass is therefore very much less for high pressure gas than for low pressure gas and so, unfortunately, whatever is done to increase the heat transfer also increases this resistance to flow and such increase is proportionately greater for the low pressure gas. With all the foregoing factors in mind, the main heat exchanger disclosed herein effects a desirable compromise of the conflicting influences and produces an efficient exchange of heat.

The preferred exchanger comprises one or more of what may be termed unit sections, each of which is complete in itself and may be added to or subtracted from like sections to make the exchanger as a whole of any desired size. For illustrative purposes, there is shown in Figs. 5 to 9 inclusive, the unit section which first receives the compressed air and from which the oxygen gas and effluent are discharged. Except for minor details of connections the unit section shown is representative of the others making up the main heat exchanger F, the liquid oxygen sub-cooler F'' and liquid air sub-cooler L.

Each unit section f as herein shown has three columns 9, 9' and 9'', each made up of a casing 11 and a multiplicity of tubes 13 arranged in a symmetrical pattern to provide numerous flow passageways through the column. For example, the particular pattern shown in Fig. 9 has been found quite satisfactory and comprises seven tubes, one 13a being centrally located with the remaining six tubes uniformly disposed about it. The size of each tube is such that all six outer tubes make contact with the central tube and with the casing, and each outer tube also makes contact with its adjacent neighbors. Thus there are in all eighteen contacts and for best results these should be metallically bonded as indicated by the numerous large dots 15. This bonding is readily accomplished by inserting wires of solder adjacent the lines of contact between the several tubes, flowing suitable flux along the solder and then heating the whole to a point where the solder will melt and effect the desired bonds.

Looking at Fig. 9, it is seen that besides the seven equal areas within the tubes 13, there are six separated areas 17 defined by the six outer tubes and the central tube 13a. Each tube area is relatively large, while the areas 17 are relatively small. The remaining six areas 19, formed between the outer tubes and the casing 11, are of an intermediate size. By selecting the proper paths for fluid flow through the tubes and through the several other spaces in the column considerable flexibility is possible because of the different cross-sectional areas of the nineteen separated flow passageways.

While the compact nested arrangement of the tubes and casing with their bonded contacts affords excellent heat transfer capacity between the fluids flowing in the several passageways, the heat transfer may be further increased by a twisted or spiraled ribbon 21 of metal inserted in one or more of the tubes with its edge soldered to the inner wall of the tube. This not only increases the metal contact but the screw-like motion imparted by the ribbon to the fluid flowing along it sets up a turbulence in the flow which has the effect of further increasing the heat transfer.

It has been found that in the apparatus herein disclosed, only one passageway is needed for the compressed air and only another for the oxygen. Preferably the air is forced through the central tube 13a of each column. In the first unit section of the main heat exchanger, there is a suitable connection 23 between the central tube of one column and a coupling 25 secured to the cover 3 of the unit container 1. The other or bottom end of this central tube is connected by a return bend 27 to the central tube of a second column, at whose top another return bend 29 connects the central tube to the corresponding tube of the third column. From the bottom end of this last central tube there is a suitable elbow section 31, by means of which connection can be made to a central tube of a column in the next adjacent unit section. This central, or air tube, is shown provided with a spiral ribbon 21 to enhance the heat transfer from the air.

In a similar manner one of the other tubes of each column is employed to provide a passageway for the oxygen. In the end unit section shown in Figs. 5 to 9, the high pressure oxygen gas would flow from a preceding unit section through an elbow fitting 33 to tube 13b thence upward and through a return bend 35 into a corresponding tube of the next column. From the bottom thereof another return bend 37 passes the oxygen gas on to a corresponding tube of the final column, from whence there is a tubular connection 39 leading to a suitable coupling 41 mounted in the cover 3, from which a short tube 43 (see Fig. 1) leads to a valve block 45 from which several delivery tubes 47 may lead to the numerous portable cylinders 7.

All the remaining tubes and the several spaces (17, 19) between the tubes and between the tubes and the casing 11 are interconnected by the internal spaces of the headers at the ends of each column. Looking at Fig. 6, the effluent from the next preceding unit section will flow through the inlet elbow 49 to the bottom header 51 from which it will pass upward through five of the tubes and the twelve spaces about the tubes in one column to the upper header 53. The latter is connected by a return bend 55 with the header 57 of the second column, through which the effluent flows to its bottom header 59. Here another suitable return bend 61 transfers the effluent to the bottom header 63 of the third column of the unit section where the gases rise through tubes and spaces into the top header 65, from whence the effluent passes through an elbow outlet 67 and connection 69 to a coupling 71 mounted in the cover 3.

Attached to the outlet elbow fitting 67 is a tubular plug 73 having a cap 75 which when screwed tight clamps a thin disk 77 over the outer opening of the plug to close it. Ordinarily however the cap 75 is backed off a turn or so from its tight position so that a small quantity of the dry effluent may pass around the disk 77 and out through a vent hole 75a in the cap. This admission of the effluent into the general space of the container keeps dry the glass wool insulation which is packed throughout this general space. It also establishes a slight pressure within the container so that the tendency is always for the effluent to leak out of the container rather than for any outside air to leak into the casing. If this arrangement were not provided the air "breathing" into and out of the container would deposit moisture and gradually wet the insulation, rendering it less effective. In the deeper colder parts the moisture would deposit as frost, and thus further deteriorate the insulation. All this is avoided by the leak of the dry effluent through the cap 75.

In Fig. 4, there is indicated a couple of unit sections making up the liquid oxygen sub-cooler F'. These sections are substantially like those shown in Figs. 5–9, except that the use of the passageways is different. In this sub-cooler the oxygen flows through the central tubes of all the columns and the effluent passes along all the other tubes and the numerous spaces between them and between them and the casing.

A multiple tube heat exchanger as described may also be used as the sub-cooler L (indicated diagrammatically in Fig. 4) for the liquid air just prior to its entry into the expansion valve, or any other suitable heat exchanger may be employed. If the type of heat exchanger herein particularly disclosed is employed then only a single unit section is required, such as is shown in Figs. 5–9. The liquid air flowing from the boiler H of the rectifier column I would pass through the central tubes of the three columns of the unit section L, while the effluent is flowing in a contrariwise direction through all the remaining passageways.

The function of the sub-cooler L is to reduce the temperature of the liquid air from its temperature when leaving the base of the rectifier column. When liquid air at what may be called the boiler temperature is expanded via the expansion valve M, a mixture of liquid and gaseous air results. The only control over the amount of gas formed at the moment of expansion of the air at the top of the rectifier is through control of the pressure in the column and the temperature of the liquid air entering the expansion valve. By reducing the temperature of the latter by utilization of the refrigeration available in the effluent, the proportion of "flash gas" can be reduced by as much as one-half under practical operating conditions.

*Automatic expansion valve*

This element M of the oxygen producing apparatus is an important one because a constant rectifier pressure is necessary for the production of oxygen of consistent purity, and the expansion valve primarily determines the rectified pressure. If the apparatus is installed on airplanes or in submarines a form of valve is required which will function independently of variations in the atmospheric pressure. If the apparatus is to be always used near the ground, where the atmospheric pressure may be taken as nearly constant, then another form of expansion valve will be satisfactory. Both forms of valve are herein disclosed.

A valve structure suitable for use where the atmospheric pressure is variable is shown in Figs. 10 and 11. It comprises a pair of cylindrical casings 79 and 81 joined by a tubular connection 83. A substantially constant pressure is maintained in the upper casing 79 about a bellows 85 adjustably mounted therein. The lower casing 81 receives a tube through which passes the high pressure liquid air from the sub-cooler L and by means of a valve 87 the pressure of this air is reduced to that desired in the rectifier. If the high pressure value changes, the valve structure as a whole responds in such manner that the liquid air is nevertheless delivered to the rectifier column at a substantially constant low pressure.

If the apparatus employing this type of valve is used where the atmospheric pressure is itself constant, then the inlet 89 to the casing 79 may be sealed or left open. But if the apparatus is used on a submarine or an aircraft or other vehicle moving speedily from one level to another then the inlet 89 should be sealed or connected to some source of constant pressure. If simply sealed it is thought that the space around the bellows 85 gradually fills with liquid air which serves reasonably well as a constant pressure environment. One convenient source of constant pressure could be a bulb 91 (see Fig. 15) housed in a casing 93 secured to the wall of the boiler I' of the rectifier column. This bulb would contain a highly volatile fluid and be connected by a tube 95 with the inlet 89 to the upper casing 79 of the expansion valve. Because the boiler temperature is normally higher than the condensation temperature of air and because the heat capacity inertia of the mass of metal and the liquid in the boiler would hinder rapid changes in this temperature, the gas pressure in the bulb 91 and hence about the bellows 85 would be maintained substantially constant.

The upper end of the bellows 85 is attached to a suitable closure plate 97 which has an upstanding threaded stem 99 on which is screwed a flanged nut 101. (The latter may also be welded as at 103 to the closure plate 97.) The top end of the stem 99 is provided with a nearly hemispherical seat for a ball bearing 105 interposed between the closure plate stem 99 and the inner end of an adjusting stem 107. The latter has an exteriorly threaded portion 107a to engage internal threads in a hub 109a of the end closure plate 109 for the casing 79 and has a knurled handle 107b for turning the stem manually. The purpose of this adjustment will be presently explained.

The lower end of the bellows also has a closure plate 111 connected by several rods 113 to a guide plate 115 surrounding the flanged nut 101 and freely movable vertically between its flange and the top closure plate 97 of the bellows. The bottom closure plate 111 has a depending stem 111a extending within and making a rather tight but nevertheless a sliding fit with the tubular connector 83 which secures the casings 79 and 81 together. This stem 111a has a central bore 111b within which is secured the upper end of the hollow stem 87a of the valve 87. Near the lower end of this stem is a guide block 117 for the valve stem. This block rests on a beveled shoulder 83a on the connector and serves as a seat for a spring 119 which extends between the block and the depending stem 111a of the lower bellows closure plate 111. Below the block 117 the valve stem 87a has side openings 87b providing for the flow of pressure between the chamber 121 in the lower end of the connector 83 and the interior of the bellows 85 via the hollow stem 87a and the bore 111b through the stem 111a and plate 111.

At the bottom end of the connector 83 is a small central hole 83b whose upper edge serves as the seat for the valve 87. Below this hole is a hollow stem 83C in which is secured the end of a tube 123 that conducts the liquid air from the subcooler L to the expansion valve. Around the wall of the chamber 121 in the connector are holes 83d through which the liquid air can pass into the interior of the casing 81 and thence through outlet 125 to the top of the rectifier column I.

The cycle of regulation by the expansion valve can best be followed by assuming that the oxygen producing apparatus is started at, let us say, normal room temperature. The adjusting stem 107 will be turned upward by the manual handle 107b to raise the upper closure plate 97 of the bellows. This will permit the bellows as a whole to move upward under the influence of the spring 119. Likewise the valve 87 will lift from its seat to an extent which will permit ready flow of the maximum quantity of air for which the apparatus is designed. Regulation of the low pressure at this stage is not desired, because cooling by isenthalpotic expansion should be as rapid as possible.

The air when warm requires a much larger opening of the valve 87, but as the air cools the resistance to flow diminishes and the valve may be moved by the handle 107b toward the closed position to keep the pressure beyond the valve 87 reasonably constant. Turning the handle 107b advances the adjusting stem 107, the bellows 85, and the valve 87 downward, the balancing spring 119 being somewhat compressed during this movement. Finally when the air is in the liquid state and a steady temperature is reached, the valve 87 can be definitely adjusted so that the pressure in the rectifier will correspond with the desired mass flow of the air. This hand adjustment continues if the mass of fluid per unit of time passing the valve 87 remains consistent with the output of the air compressor and the high pressure for which the unit is designed. This high pressure is a measure of the total refrigeration produced and a higher pressure is required for the production of liquid oxygen than is necessary for an equal amount of gaseous oxygen.

If thereafter the high pressure value increases a greater mass rate of flow to the valve 87 occurs, causing the valve to be moved upward from its seat, the bellows 87 being slightly compressed by the consequent upward movement of the stem 87a and the plate 111. This opening of the valve admits more fluid into the chamber 121 at the lower end of the connector 83, thereby raising the low pressure in this chamber. But this increase in pressure is at once communicated to the interior of the bellows 85 via the holes 87b, the hollow stem 87a and the bore 111b and the resulting increased pressure in the bellows causes it to expand, push the plate 111 downward and move the needle valve 87 toward its seat, thus restricting the inflow of the high pressure fluid and restoring the desired normal low pressure of the liquid air delivered to the rectifier.

If the high pressure in the tube 123 should be reduced the pressure in the space 121 will fall and this drop in pressure will likewise be communicated to the interior of the bellows 85. The latter will be compressed by the force exerted by the balancing spring 119 and the constant pressure maintained in the casing 79 around the bellows. Thus the needle valve 87 will be lifted from its seat admitting more of the high pressure fluid to restore the desired normal low pressure.

Since the actuation of the needle valve is dependent upon the variations in the high pressure fluid flowing to it through tube 123, and is not affected by changes in the outside atmospheric pressure, this form of automatic expansion valve, shown in Figs. 10 and 11, should be employed whenever the oxygen producing apparatus is to be used where changes in the atmospheric pressure are expected to be encountered.

The expansion valve shown in Figs. 12, 13 and 14 may be used where the oxygen producing apparatus is maintained near the ground, that is where the atmospheric pressure about it is substantially constant. In this form the high pressure liquid air flows through tube 123 from the sub-cooler L to an opening 127 in a partially internal casing 129 secured to an outer casing 131 having an outlet 133 which is connected with the rectifier I. The edge of this opening 127 constitutes a seat for a needle valve 135 which is secured in the lower end of a tube 137 extending upward and to a bottom closure plate 139 of a bellows 141. This closure plate is movable, being secured to sleeves 143 which are slidable on rods 145 fixed to a supporting plate 147 and to a top plate 149 to which the upper end of the bellows is sealed. Inside the bellows 141 is a spring 151 under compression so as to tend to force the bottom closure plate 139 and tube 137 downward and move the valve 135 toward its seat. The lower end of a hub 139a depending from the closure plate 139 is secured to a second bellows 153 which at its other end is sealed to an externally threaded sleeve 155 around the tube 137. This sleeve 155 is fixedly attached to the supporting plate 147, and the bellows 153 serves as a leak-proof yieldable connection between this fixed sleeve and the movable bellows plate 139. Mounted on the threads of the sleeve 155 is an adjusting nut 157 carrying a ball bearing 159 upon which is seated one end of a coiled spring 161, the upper end of which engages the bellows plate 139. Within the bellows 141 is the compression spring 151 acting on plate 139 in opposition to spring 161. By using two such springs in opposed relation a very nice adjustment between the effective spring pressure and the weight of the movable parts can be assured.

Normally the liquid air from tube 123 flows through the opening 127 past the valve 135 into a lower portion 165a of a chamber 165 in the casing 129 and thence through ports 167 in a guide block 169 to the upper portion 165b of the chamber 165. This guide block is not movable being secured to the bottom of casing 129 by one or more bolts 171. From the chamber 165, the liquid flows through holes 129a in the wall of casing 129 into the chamber 173 of casing 131 and thence through the outlet 133 to the rectifier column.

Here, as with the expansion valve of Figs. 10 and 11, the valve 135 is set relatively wide open when the apparatus is started in operation. That is, the nut 157 is turned upward on the sleeve 155 compressing both springs 161 and 151, and contracting the bellows 141. The plate 139 moves upward and with it goes the tube 137, thus lifting the valve 135 from its seat. When the proper flow of liquid air has been established, the nut 157 is turned downward until the valve 135 is so positioned with respect to its seat that the rate of flow of liquid air past the valve produces the desired lower pressure in chambers 165 and 173, and hence in the rectifier column I.

Should the high pressure of the liquid air increase, it will cause a rise of the low pressure in the chamber 165 and this rise will be communicated through holes 137a in the wall of tube 137 and thence through this tube to the interior of the bellows 141. The latter will expand and cause the plate 139, the tube 137 and the valve 135 to move downward thus restricting the flow of high pressure fluid past the valve and restoring the desired low pressure in chambers 165 and 173 and in the rectifier. Conversely, if the high pressure falls the consequent drop in the low pressure in chamber 165 will be felt within the bellows 141 and the latter will contract, thus causing plate 139, tube 137 and the valve 135 to move upward to admit more fluid to the chambers 165 and 173 and restoring the desired low pressure therein and in the rectifier column as well.

Thus, as was stated at the outset of this description of the expansion valves, the present invention provides for the maintenance of a substantially constant low pressure in the rectifier column and, as a result, the purity of the oxygen produced is kept very high.

The rectifier column

Figure 15:
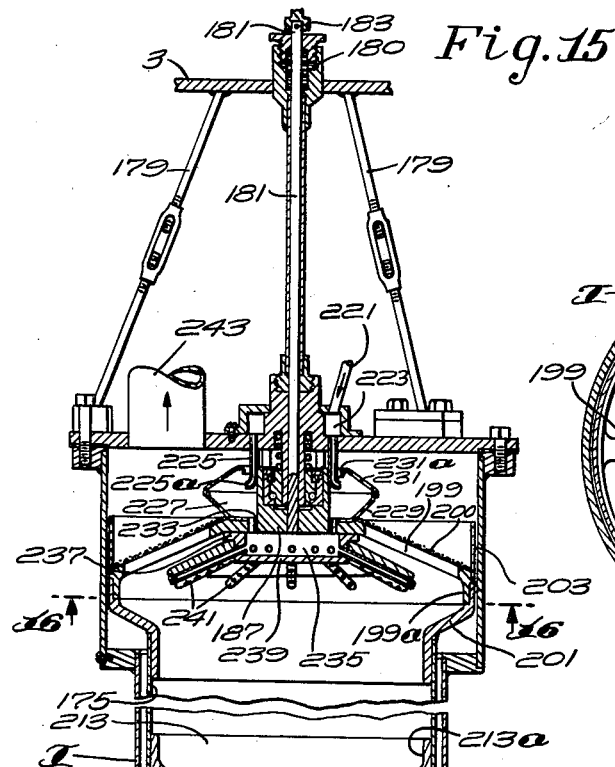
Fig. 15 is a medial vertical section showing a rectifier column with a rotating distributor.
Figure 16:
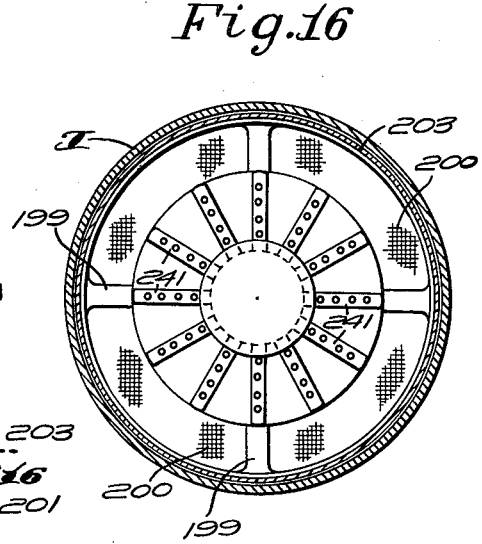
Fig. 16 is a horizontal section, looking upward, taken as on line 16—16 of Fig. 15.
Figure 17:
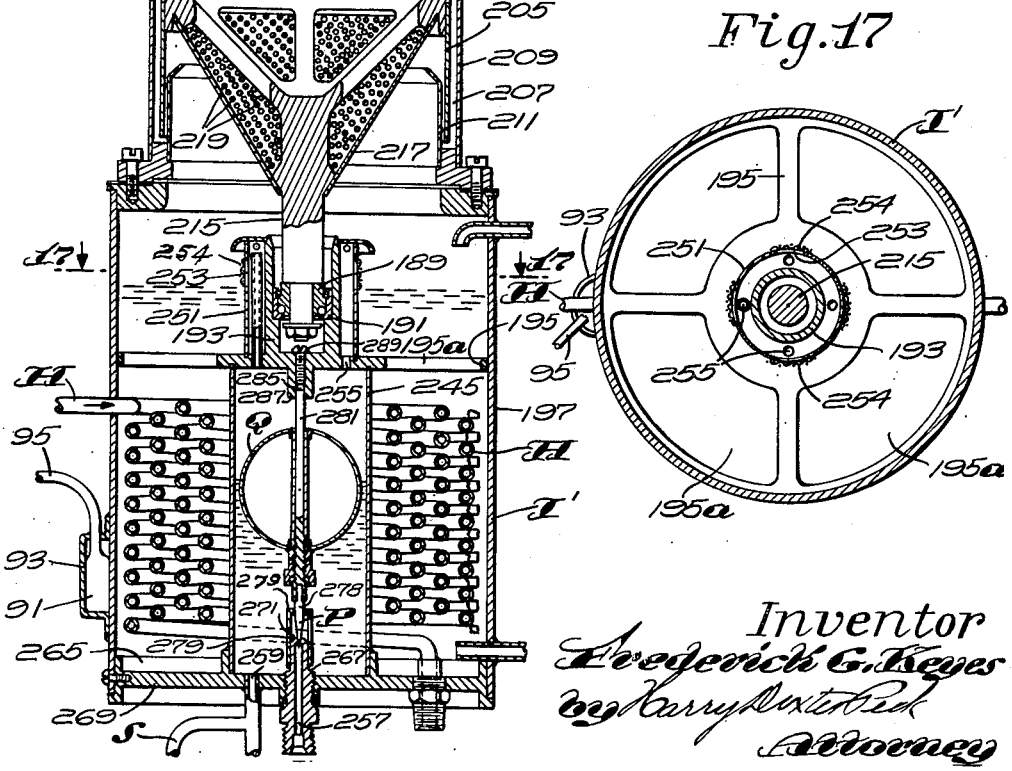
Fig. 17 is a downwardly viewed section, taken as on line 17—17 of Fig. 15.

In Figs. 15 to 20 inclusive are disclosed several features of rectifier columns I found satisfactory in the improved oxygen producing apparatus. Figs. 15, 16 and 17 show a preferred form of rectifier to be used when the apparatus is on a moving vehicle and subject to more or less tilting. In this form there is a rotating distributor 175 which has been found to effect the desired distribution throughout the column even while the latter may be tilted appreciably from the vertical. In Figs. 18 and 19 is shown a column having a fixed spiral deflector 177. While this may be used with apparatus mounted on a vehicle, it performs best when the apparatus is not tilted but normally remains with the rectifier vertical.

The top of the rectifier column illustrated in Figs. 15–17 is supported from the cover 3 by tie rods 179. Extending through the cover 3 and a suitable packing device 180 is a shaft 181 having connection via a flexible shaft 183 with a motor 185 (see Fig. 1) mounted on the cover 3. The inner end of this shaft 181 is attached to the upper axle 187 of the rotatable distributor 175, whose lower axle 189 is journaled in an anti-friction bearing 191 mounted in an upstanding hub 193 at the center of a spider plate 195 secured to the wall 197 of the bottom portion I' of the column.

Attached to the upper axle 187 is a sort of cone-shaped spider plate 199 whose openings are covered by a screen 200 and whose outer depending rim 199a is secured to a flared section 201 of the distributor casing. A skirt 203 upstands from this section and a cylindrical casing 205 depends from it into an annular space 207 between a fixed outer shell 209 and a fixed inner shell 211. This space will collect enough liquid to provide a seal for the lower end of the casing 205.

Attached to the casing 205 is another sort of cone-shaped spider plate 213 whose apex terminates in an extended hub 215 at the lower end of which is the lower axle 189. Between the upper outer rim 213a of this spider plate and a point midway along the hub 215 is a perforated cone-shaped plate 217. The formation of this perforated plate is important in that it must serve to permit descending liquid to drop into the boiler I' while enabling any ascending gases to pass upward through the column. The perforated plate should be positioned at an angle of approximately 30° from the vertical. This particular arrangement has been found quite satisfactory in that it provides for a rather even dripping of the liquid downward from the perforations and for a similar distributed entry of the gases moving upward into the distributor, which is for the most part filled with surface-providing packings (not shown).

Liquid air is received through tube 221 connected to the outlet 125 (or 133) from the expansion valve. The air first enters an annular chamber 223 at the very top of the column and flows downward therefrom through several tubes 225 into a flash separator chamber 227. This chamber is formed in part by a casing 229 which extends upward and outward to join a sort of cover 231 which extends upward and inward to terminate in a rolled-down neck portion 231a. The lower ends of the tubes 225 constitute nozzles 225a which are disposed so as to direct the descending liquid air beyond the neck 231a under the cover 231. If any of the liquid air should "flash" back to the gaseous state, the gas can pass upward through the neck opening into the space at the top of the column.

From the chamber 227 the liquid air passes through openings 233 in the bottom of the casing 229 and spider plate 199 into a chamber 235 formed below the axle 187 by a depending flanged ring 237 and a bottom plate 239 sealed thereto. From the side wall of this ring a series of perforated tubes 241 extend outward and somewhat downward over the space of the distributor. The liquid air falls from these perforations with considerable uniformity upon the surface-providing packings.

Since the distributor as a whole is constantly rotating at a relatively slow speed, the intermingling of the liquid and the gases is markedly uniform throughout the entire column. And because the distributor is rotating, the liquid therein is carried round and round whether the axis of the column is maintained vertical or is variously tilted therefrom.

The rising gases which reach the top of the rectifier column and constitute the effluent pass off through the outlet 243 and pursue the course hereinbefore described. The liquid drip from the distributor falls into base I' of the rectifier or what is also called the boiler. This contains the tube H coiled with many turns about a central casing 245. During its flow through the coils of tube H the compressed air from the main heat exchanger F is transformed from the gaseous to the liquid state. In this transformation heat is liberated from the air and absorbed by the liquid in the boiler bathing the coiled tube. Actually this latter liquid is rich in oxygen since the heat absorbed by it causes the nitrogen and argon and other ingredients that might be present to "boil off" and pass upward through the rectifier. These vapors pick up other vapors and any gaseous air separating from the liquid air as it moves downward within the distributor.

As the level of the liquid oxygen in the boiler rises, it eventually reaches suitably screened holes 253 in the wall of the upper casing 251 and flows therethrough into the annular space between this casing and the upstanding hub 193 of the spider plate 195. Thence the liquid falls therefrom through holes 255 into the central casing 245 for discharge through a valved outlet 257 whence it flows, as hereinbefore described, to the oxygen sub-cooler F'. The outlet 257 is controlled by a float valve P, to be hereinafter more particularly described, but suffice it to say the float Q and valve P normally enable all the liquid oxygen passing through the screened holes 253 to be discharged from the outlet 257 to the sub-cooler F'. As previously described, if for any reason the production of liquid oxygen should exceed the flow capacity of the valved outlet 257, a valve T can be opened and the oxygen can then pass through the outlet 259 and through tube S to join with the flow from the outlet 257. Thus under normal conditions the liquid level in the boiler is not permitted to exceed the height determined by the screened holes 253.

Figs. 18 and 19 show a rectifier column having a stationary helical distributor 177 therein. This comprises a central tube 259 (closed at both ends) to which is secured the inner edge of a perforated plate 261 which is wound helically about the central tube. The outer edge of the plate is secured to the cylindrical casing 263 of the rectifier and space between the turns of the plate is filled with suitable surfacing-providing packing 219.

Liquid air from the expansion valve enters the column through a tube 221a. It can then pass through the several chambers heretofore described in connection with Fig. 15 and eventually drop from the several perforated tubes 241 onto the packing 219. Upon the liquid encountering the perforated helical plate 261 it is given a sort of general clockwise movement around the column as it descends. Some of it may, of course, pass through the perforations 261a of the plate. Likewise the gases or vapors rising from the bottom I' of the rectifier pass upward through the perforations and between the packing elements and follow a general helical direction of flow in a counter-clockwise direction. Thus there is an intimate mingling of the descending liquid and the rising vapors, and as a result a satisfactory rectification is accomplished in a compact space. This is believed due in large part to the uniformity of distribution of the falling liquid and the definite helical course of flow given to the rising vapors.

In this rectifier column, as in that of Figs. 15 to 17, the descending liquid falls into an annular space in which the tube H is coiled about a central casing. In due course liquid oxygen enters this central casing and is discharged therefrom through an outlet 257 controlled by a float valve, the details of which are more clearly disclosed in Fig. 20.

Float valve

In the operation of a rectifier column separating air constituents generally, and especially in the production of liquefied oxygen, it is highly desirable that the liquid in the bottom of the column be maintained at a predetermined level. A float valve would seem to be the means to employ for this purpose but any ordinary device has heretofore not proven satisfactory because of the peculiar difficulties which attend the distillation of liquid air. These are caused by the small amounts of carbon dioxide which reach the rectifier either through the carrying over of solid carbon dioxide dust with the liquid air introduced at the top of the column, or by the depositing of such dust out of solution under the conditions of continuous evaporation maintained in the bottom of the column. This carbon dioxide in the form of dust particles collects and builds up on the seat of the valve causing gradual obstruction to flow of the liquid oxygen and malfunctioning of the valve itself. The elimination of the peculiar difficulties has been attained by the structure shown in Figs. 15 and 20.

The descending liquid from the distributor 175 or 177 passes through openings 195a in the supporting plate 195 and falls into the boiler of the column onto the coils of the tube H outside of the central casing 245. Thus the heaviest particles of carbon dioxide can immediately settle downward past the tube into an annular well 265 at the very bottom of the column. When the level of liquid in the boiler rises to the openings 253 in the central casing 251, it passes through metal gauze screens 254 of fine mesh, say 300 per square inch, which cover the openings. These screens prevent passage into the casing of the coarsest particles of carbon dioxide still floating in the liquid oxygen. Such smaller coarse particles as do pass the screens have another opportunity to settle to the bottom of the casing around the stem 267 which extends upward through the bottom plate 269 of the rectifier column. Despite all these precautions, very fine particles of carbon dioxide, of the order from 0.001 to 0.004 inch in extent, would ordinarily settle on the valve seat and upset the proper functioning of the valve.

This difficulty has been avoided, however, by employing what might be termed a "square" type of valve seat, that is, one in which the depth of a circular orifice is equal to its diameter. (See Fig. 20.) The upper or top surface 271 of the stem 267 diverges downward from the upper edge 273 of the orifice 275. The latter may be a truly cylindrical hole, but preferably its wall 277 diverges downward also. This arrangement of the two downwardly diverging surfaces provides a sharp bearing edge or seat 273 for the needle valve P.

The stem 278 of this valve extends through a suitable guide 279 attached to valve seat stem 267, and is secured to a rod 281 to which is also attached the ball-float Q. The lower end of the valve P is a long cone whose surface elements are of an angle of about 10° with the axis of the valve. The cone point accordingly extends through the orifice 275 even when the valve is lifted from the sharp edged seat 273, it being a feature of the design that the lift of the float and valve is limited to an extent that will prevent the lower point of the valve from rising above the plane of the lower edge 283 of the orifice. This predetermined lift of the valve from its seat is calculated to give the greatest annular space between the valve and the seat edge consistent with the flow area required. The maintenance of this narrow annular opening insures rapid flow of the liquid oxygen and, what is more important, the rapid passing of the carbon dioxide dust particles through the orifice. Any that might cling to the sharp edge of the seat are wiped off as the long pointed valve moves toward or from its closed position.

The upper end of the float valve rod 281 extends into a cylindrical hole 285 of a depending hub 287 on the supporting plate 195. The upper opening of this hole is closed by a screw plug 289.

As a whole the arrangement enables much of the heavy particles of carbon dioxide to settle to the bottom of the boiler outside of the casing 245, and those that tend to flow into the casing are arrested by the fine screens over the holes 253. Such particles as do pass the screens can likewise settle to the bottom of the casing 245 below the upstanding valve seat 273. The "square" type orifice with its sharp edged seat and the continuously penetrating needle keep the seat free from the very fine particles of carbon dioxide dust which might otherwise collect thereon. Thus the valve continues clean and functions reliably with consistency of performance.

Vacuum jacketed flexible metal hose

It was noted earlier herein that the oxygen producing apparatus might be employed for the sole purpose of producing liquid oxygen or that a portion of the liquid oxygen can be delivered as such while the remainder is transformed into high pressure oxygen gas. Ordinarily such liquid oxygen is not stored in the customary cylinders used for gaseous oxygen and so it is convenient to provide a flexible hose for the delivery of the liquid oxygen to other suitable containers.

But the temperature of liquefied oxygen is about 300° F. below zero, and it has a low heat of evaporation. Unless special precautions are taken considerable losses by evaporation are likely to occur during the delivery of the liquid oxygen. Such precautions are amply taken in the hose 290 provided for the apparatus. It is desirable that such a hose be made of metal for durability, yet be conveniently flexible and, above all, have high heat insulating capacity. The hose shown in Figs. 21–24 meets all these requirements.

At one end of the hose is a member 291 to which the pipe from the wire cloth filter R may be attached. This member has a central passage 291a, slightly enlarged at its inner end to receive a flexible metal tube 293 which is soldered to the member within the enlargement. This tube extends throughout the length of the hose and constitutes the flow passage for the liquid oxygen. If the oxygen producing apparatus is used solely for the production of such oxygen, the hose should be larger than if the product is primarily oxygen gas. In such a large hose this inner flow tube can be made of flexible corrugated metal. If a smaller hose is all that is needed, this inner tube can be made of low brass which has a high fatigue point and which, when thoroughly annealed, can endure bending many times without fracture.

At its delivery end the inner tube 293 is sealed to a suitable piece of stiff tubing 295 which serves as a nozzle for delivery of the oxygen into proper containers therefor. Around this piece of stiff tubing is secured a collar 297 having a reduced stem 297a. Sealed to the outer side of this stem and to the shoulder 297b formed thereby is a flexible corrugated metal sleeve 299 which extends along the inner flow tube in spaced relation thereto and terminates in a sealed connection with a metal tubular shell 301. The latter is secured to the member 291 and provides a pocket or annular space about the inner tube beyond the said member in the direction of flow. At the end of this annular space is a screen partition 303 between the inner tube 293 and the shell 301. This pocket or annular space is filled with adsorbent charcoal 305. Between the inner tube 293 and the flexible outer sleeve 299 is a packing of glass twine and glass cloth 307. This packing not only serves as a heat insulator but also prevents contact of the two metal portions (293 and 299) of the hose when the latter is flexed.

From a side of the metal shell 301 around the pocket or annular space filled with the charcoal, a small bent tube 309 extends for connection with an exhauster by means of which a vacuum is pumped in the hose while the latter is maintained at a suitable high temperature of say 250° F. When as complete a vacuum has been effected as possible, the bottom of the bent tube 309 is pinched as shown in Fig. 24, against a piece of soft solder 311 previously inserted in the tube. Then the tube is heated sufficiently to melt the solder and effectively seal the tube to preserve the vacuum in the hose. The maintenance of this vacuum is essential in preserving the insulating properties of the hose at a high degree of effectiveness.

When the liquid oxygen enters the inner tube 293 the first effect is to cool the charcoal 305. This promotes high activity on the part of the charcoal and any gases within the entire hose are removed by adsorption on the charcoal surface. As the oxygen flows along the hose the inner tube 293 is cooled down and once cooled, the oxygen is delivered from the outlet end 295 without loss due to evaporation. The adsorbent action of the glass cloth 307 in the flexible portion of the tube is not great but if any vapor forms on the surface of the glass it is removed from such phase by the charcoal which under the conditions described is highly effective as an adsorbent. Thus the hose as a whole is durable, flexible and maintains the liquid oxygen at a temperature where loss by evaporation is negligible.

*Liquid oxygen pump*

In the oxygen producing industry, where gaseous oxygen of desired purity is produced, it is customary to lead such gas to a compressor which compresses the oxygen to a pressure of about 2200 pounds per square inch for delivery into the usual storage cylinders. If the oxygen producing apparatus herein disclosed is to be as compact as desired, it is apparent that the customary oxygen compressor must be omitted.

To produce gaseous oxygen at the desired temperature and pressure a pump has been developed to act on the oxygen while it is in the liquid state and thereby obtain the necessary pressure. The main heat exchanger is utilized to transform this high pressure liquid to high pressure gas of the desired temperature. This makes it possible for gaseous oxygen to be delivered from the apparatus directly into the usual cylinders at any temperature and pressure desired.

The pump W developed for the purpose is shown in Figs. 25–37. While the prime mover for the pump may be any suitable driving means, such as an electric motor for example, it was noted earlier in the general description of the apparatus that it is convenient to utilize the available high pressure compressed air as the motive force for the pump. This air pressure is employed to drive the moving parts through the power stroke, meaning the stroke during which the high pressure is imparted to the oxygen, while the return stroke is effected by suitable springs which are compressed during the power stroke. It was also noted earlier herein that part of the compressed air is employed in a thermal capacity in connection with the pump to retain some of the refrigeration which would otherwise be lost.

Seen externally, as in Fig. 25, the pump is attached to and for the most part depends below the cover 3 of the main container. Above the latter is a cap 313 which overlies an air inlet to the power cylinder. Below the cover 3 is a cylindrical casing 315 extending downward to an insulating block 317, and from this block another cylindrical casing 319 extends downward to a bottom closure plate 321. A bottom flange 315a on the upper casing 315 and a top flange 319a on the lower casing 319 are securely clamped to the insulating block 317 by numerous bolts 323. The tube a" from the compressed air supply line is closely wrapped a number of turns t around the upper end of the upper casing 315 and then laid around the casing to bring it to the lower end where it is again tightly coiled at t' about the casing and finally led to the main heat exchanger F. The lower casing 319 has an inlet connection 325 and an outlet connection 327 for the effluent which is passed through the casing on its way from the rectifier column I to the oxygen sub-cooler F'. The threaded stems 329, 331 at the bottom of the pump are for the admission and discharge of the liquid oxygen.

Looking now at Fig. 26, which is a partial section taken as on line 26—26 of Fig. 25, there are three tie rods 333 within the upper casing 315 which extend from the cover 3 through the insulating block 217. In the upper casing 315 is housed the air cylinder 335, valve block 337, and mechanism by which the valves in this block are automatically actuated. A part of this mechanism is a clamping or connection block 339 in the upper portion of which a piston rod 341 of an air piston is secured and in the lower portion of which is secured a plunger rod 343 projecting upward through the insulating block 317 from the head of an oxygen plunger. Also extending through the insulating block 317 are three other tie rods 345 whose lower ends are secured to a lower plate 347. This lower plate 347 and a similar upper plate 349 are at opposite ends of an oxygen cylinder 351, below which is a valve block 353 containing the valves which control the flow to and from the oxygen cylinder. From the lower plate 347, three relatively short rods 355 extend upward through the upper plate 349 to a movable plate 357, and on these three short rods are mounted springs 359 which effect the upward or return stroke of all the moving parts in the pump.

The power or air cylinder 335 and piston 361 are shown in Fig. 27. The cylinder is a block having bores of different diameters. At the bottom is a bore 363 which receives a bearing sleeve 365 for the piston rod 341. Immediately above is a bore 367 for the piston rod itself and above this is a larger bore 369 providing an annular space 371 around the piston rod for the lower portion of a compression spring 373. The remainder of the block has a large bore 375 within which is tightly fitted a bearing sleeve 377, and within this sleeve is the air piston 361.

The top of the air cylinder is closed by a head block 379 except for a passageway 381 through the portion 379a of the block which projects upward through the cover 3 of the container. The block has a flanged portion 379b which holds a washer 383 against the top edge of the bearing sleeve 377 and against the top edge of the cylinder wall 335. A suitably shaped cap 385 fits about the head block 379 and has a skirt 385a threadedly engaged with the cylinder block. By tightening this cap the head block and washer are made tight to the cylinder and the bearing sleeve 377. The small central bore 381 at the bottom of the head block enlarges to provide a tapered seat 387 for the cone-shaped end of a tubular member 389 whose shank portion extends upward through a packing 391 and packing nut 393. To the top of the tubular member a T 395 is sweated, into the side of which is secured a transfer tube 397 leading from the air valve block 337. In the top of the T is a sleeve 399 with a plug 401 closing its bore.

Certain principles underlying the construction of the oxygen plunger are incorporated in the air piston in that the latter is made with two sections 361a and 361b with a series of rings or washers 403 adapted to be compressed by the two sections. The upper section 361a has a cylindrical head 361a' making a running fit with the bearing sleeve 377 and extending downward from this head is a relatively long cylindrical stem 361a'' around the greater part of which are the washers 403. The lower end of the stem fits within a central bore 361b' of the lower section 361b of the piston. This is a cylindrical block having a running fit with the bearing sleeve and having a depending flange 361b'', the lower edge of which is spun over the edge of a contact piece 404 for the piston rod 341.

The washers 403 are of two kinds of material, those marked m being made of metal and those marked c being made of a compound known as "Koroseal." When the driving pressure is applied to the head 361a' of the piston, the upper section 361a moves slightly toward the lower section 361b, the latter being momentarily restrained from moving by the spring 373. This relative movement of the piston parts applies a compressive force on the washers. The compound washers c are accordingly slightly compressed axially and slightly expanded radially, thus insuring several very tight seals with the bearing sleeve to make the piston leak-proof during its power stroke. When the latter is completed the driving pressure is cut off and the air in the cylinder released, thus permitting the piston to move upward slightly under the force of spring 373 even before the springs 359 in the oxygen end of the pump effect the return stroke of the moving parts. This initial slight movement of the air piston enables the compound washers to expand slightly in the axial direction and retract slightly in the radial direction, thus enabling the upward stroke of the piston to be accomplished with only light frictional resistance between it and the bearing sleeve 377.

The details of the oxygen cylinder 351 and its plunger 405 are shown in Figs. 28–30. The cylinder 351 has a central bore 351a in which moves a novel plunger 405 particularly illustrated in Fig. 29. Like the air piston, this oxygen plunger is made in two sections, a head section 405a and a base section 405b. The head section 405a has a socket 405c at its top end on the bottom of which is a contact piece 407 for the plunger rod 343, the top of the contact piece being dome-shaped to make a more or less point contact with the plunger rod. The latter is necked or grooved at 343a to receive an internal flange 409a of a hollow nut 409 threaded into the socket 405c. This flange 409a is of a thickness less than the axial extent of the groove 343a on the plunger rod 343 to permit a limited amount of lost motion between the oxygen plunger and the plunger rod. As shown more clearly in Fig. 28, the reciprocating plunger rod 343 extends upwardly through the cylinder 351 and passes through a packing gland 406 built into the upper part of this cylinder.

The upper portion of the head 405a of the plunger makes a running fit with the wall of the cylinder and is provided with an internal annular groove 405d formed between a short skirt 405e at the edge of the head and a central stem 405f. This stem is of appreciable size near the head but is then reduced in diameter to provide a rod-like portion 405g on the end of which is threaded a nut 411.

The base section 405b of the plunger has a bottom portion which also makes a running fit with the cylinder wall. From this portion a sleeve 405h extends upward with its end terminating in the annular groove 405d of the plunger head. On the inner side of this sleeve is an internal flange 405i which fits around the rod-like portion 405g and against which the annular face at the bottom of the larger portion 405f of the stem may seat as seen in Fig. 29. Below the flange 405i is a sleeve or distance-piece 413 about the rod-like portion 405g and between this piece and the sleeve 405h is a coiled spring 415 which seats on the internal flange 405i and on the nut 411. A threaded plug 417 and an aluminum washer 419 effect a tight closure of the bore in the lower portion of the plunger.

Between the skirt 405e of the plunger head and a shoulder 405j on the plunger base is a series of washers 420 fitting nicely around the sleeve 405h. The two washers l at both ends of the series are made of leather, the washers g next adjacent thereto are made of graphite, and the washers m next to the graphite washers are made of metal, preferably brass. Then follows throughout the remainder of the series a pair of leather washers, another metal washer, and so on, with another graphite washer g at the center of the series. As in the case of the air piston washers, the leather washers of the oxygen plunger are compressed and expanded during the compressing stroke of the plunger and are relieved so as to slightly contact on the return or intake stroke.

That is, when the plunger rod 343 is forced downward it bears on the contact piece 407 and pushes the head of the plunger downward. The resistance of the liquid oxygen under the base of the plunger restricts the initial movement of the latter so that the skirt 405e of the head acts with compressive force on the series of washers, thus causing the leather washers to be compressed and slightly expanded into tight contact with the wall of the plunger. On the reverse or intake stroke, the initial upward movement of the plunger rod 343 lifts the head 405a and its depending stem 405g so that the nut 411 compresses the spring 415. This relative movement between the head and base relieves all compression from the washers thus allowing the leather washers to contract radially and slide easily along the cylinder wall. If there is any tendency of the washers to bind, the base is freed from such binding when the nut 411 brings up against the distance piece 413.

The function of the graphite washers in the series about the oxygen plunger is to keep the leather washers in alignment in the event that they are in the first instance of slightly different thicknesses or tend to become so after being repeatedly compressed and expanded. The metal washers serve to reinforce the series but are preferably of slightly less diameter than that of the cylinder wall, whereas the graphite washers are made of substantially the same diameter as that of the cylinder wall and therefore prevent fraying of the edges of the leather washers.

Screwed onto the lower end of the oxygen cylinder 351 is a cylindrical block 353 (see Fig. 28) embodying the inlet and outlet passageways for the liquid oxygen. The block has a pair of bores 353a and 353b which terminate just short of the cylinder and are separately connected to the space thereof below the plunger by small bores 353c and 353d. A tubular connector 421 is screwed into the inlet bore 353a and houses at its inlet end a check valve. This is a ball 423 normally pressed to its seat by a spring 425, the latter acting against a sleeve 427 at the upper end of the connector. During the upward or intake stroke of the plunger the ball is lifted from its seat permitting the liquid oxygen from the wire cloth filter U to enter the oxygen cylinder under the rising plunger. As the inflow stops the ball is seated thus checking any escape of the liquid oxygen back through the inlet passageway.

When the plunger descends the stroke is relatively very rapid and a high pressure is imparted to the liquid oxygen which flows through the connecting passageway 353d into the outlet passageway. The latter also contains a check valve 429 in the form of a cone head 429a with a cylindrical skirt 429b depending therefrom. This head 429a is tapered to fit a tapered seat 353e in the upper end of the bore 353b and below the tapered portion are holes 429c through the skirt portion. Inside the skirt and extending below it is a strong coiled spring 431 that bottoms on another connector 433 screwed into the end of the bore 353b. As the plunger moves downward, the pressure developed in the oxygen overcomes the force of spring 431 and slides the valve 429 downward, the oxygen flowing through the opening defined by the tapered seat 353e and through the holes 429c into the hollow of the skirt 429b and thence through the bore 353b and connector 433 and a tube connected thereto leading to the main heat exchanger F. At the end of the compression stroke, the valve 429 is tightly seated by the spring 431 so that there will be no escape of the high pressure oxygen during the upward or intake stroke of the plunger.

Although the oxygen plunger has proven to be substantially leak-proof, there is provision for return to the valve block of any stray oxygen that may eventually accumulate above the plunger. This comprises a simple tube connector 435 from the upper end of the cylinder to a check valve coupling 437 and another tube 439 connecting this coupling to the inlet bore 353a. The connector 421 and the sleeve 427 have a suitable groove 421a at their inner ends to pass any flow past the check valve 437 to the inner end of the inlet bore. The check valve 437 will permit flow of the oxygen from the upper end of the cylinder 351 if the accumulation becomes great enough, but will prevent any flow toward the space above the plunger.

As heretofore noted the power or oxygen compressing stroke is a rapid one and no attempt is made to control its speed. Its occurrence, however, is controlled by regulating the exhaust of the air from the air cylinder, thus determining the speed of the return stroke and thereby the frequency with which the power stroke takes place. The control means are illustrated in Figs. 31–37.

Fig. 31 is a somewhat diagrammatic showing to illustrate the course of the air flow. Compressed air comes from the supply through the tube a' to the valve block 337. From the latter the air flows through the transfer tube 397 to the fitting 395 at the top of the pump and thence into the air cylinder 335 to effect the driving or compressing stroke. As will presently appear, when this stroke is completed the valves in the block 337 are shifted so that the flow of incoming air is cut off, and the transfer tube 397 is connected to an exhaust tube 441. Thus the air that has done its work in the cylinder escapes past an adjustable restriction valve 443 into the tube a' which is connected to the effluent passageway of the main heat exchanger. By adjusting the valve stem 443a, the rate of flow of the discharging air can be set as desired, thus regulating the speed of the return stroke and the periods between the power or compressing strokes. As indicated in Fig. 31 the valve stem is above the cover 3 of the main container and readily accessible for manual adjustment.

Looking now at Fig. 32, the valve block has two vertical bores 445 and 447, a horizontal bore 449 connecting the two, and another horizontal bore 451 leading from the vertical bore 445 through a connector 453 to the tube 441. In the upper portion of each bore is a spring 455, 457 compressed between the bottom of a tubular conector 459, 461 and a guide washer 463, 465. These washers rest on shoulders in the respective bores 445 and 447 and act as guides for upstanding stems 467a and 469a of valves 467 and 469 from which depending stems 467b and 469b project through valve seats 445a and 447a formed at the lower ends of the bores 445 and 447. The lower stems 467b and 469b are engaged by push rods 471 and 473 which extend through suitable bores, packings and packing nuts 475, 477 to below the valve block 337.

The right hand vertical bore 447 is joined by the connector 461 with the air inlet tube a', the left hand bore 445 is joined by the connector 459 with the transfer tube 397, and the short horizontal bore 451 is joined by the connector 453 with the tube 441 leading to the adjustable restriction valve 443.

When the valve 467 in the left hand vertical bore 445 is seated the exhaust passageway will be closed. But when this valve 467 is seated, the other valve 469 will be open and air under pressure can pass through the horizontal bore 449 and thence upward through the bore 445 and transfer tube 397 to the air cylinder to effect the power stroke. Note that the instant the inlet valve 469 is opened the full force of the air pressure is admitted to the cylinder to produce a rapid power stroke. Then the valves are shifted, the inlet valve 469 being seated and exhaust valve 467 being opened. This cuts off the air supply and opens the escape passageway for the air from the cylinder. This air flows back through the transfer tube 397, past the new open valve 467, and on through bore 451 and the exhaust tube 441 to the restriction valve 443, where, as before noted, the rate of its escape is regulated as desired.

The inlet valve 469 and the exhaust valve 467 are lifted from their respective seats by the push rods 473 and 471 respectively and the movements of these rods is effected by a snap-action mechanism below the valve block. This comprises a sort of T-shaped lever 479 having a body 479a with one arm 479b integral and another arm 479c pivoted at 479d to the body. At the upper end of the body is a knife edge 479e resting in a V-groove across the bottom of an adjustable bearing stem 337a on the base of the valve block 337. The lower end of the T-lever has a V-groove 479f across it in which a knife edge 481a on the upper flanged head 481b of a two-part telescoping rod 481. The lower part of the rod also has a flanged head 481c with a knife edge 481d which rests in a V-groove 483a in a base member 483 of a frame secured to the valve block 337 by side bars 485 and 487. A load spring 489 is coiled about the two-part rod 481 and seats on both of its flanged heads, being always compressed so that its force is at all times applied to the T-shaped lever.

Pivotally mounted at 491 on the base member 483 is a cam lever 493 having at its upper end a stub shaft 493a which extends sidewise from the lever into a somewhat enlarged bearing hole 479g near the bottom end of the body of the T-shaped lever 479. In its lower portion the cam lever has an opening 493b (see Fig. 33) whose sides constitute cam surfaces on which rides a roller 495 carried by a shaft 497 mounted on the clamping block 339 which fastens the piston rod and the plunger rod together. The roller moves vertically downward and upward in a straight path in accordance with the power and return strokes of the pump.

In order to follow the cycle of the power piston, the oxygen plunger and the associated valve mechanism, let us start at the beginning of a power stroke. The various movable parts will then be in the positions shown in Figs. 32 and 33.

Both the power piston and the oxygen plunger will be at the topmost ends of their respective cylinders. The roller 495 will also be at its topmost position in the highest part of the cam hole. The surfaces of the cam are so shaped and disposed in the lever 493 that when the roller is at its topmost point of travel the cam lever 493 will be tilted slightly clockwise and the T-shaped lever 479 tilted counterclockwise, as it were, with its pivoted arm 479c in contact with the inlet valve push rod 473. Thus the inlet valve 469 will be held open, and since the integral arm 479b of the T-shaped lever is separated from the exhaust valve push rod 471 the exhaust valve 467 will be closed. With the valves thus positioned the high pressure air is effective to drive the power piston, piston rod, roller and oxygen plunger rapidly downward, the latter forcing the charge of liquid oxygen in its cylinder outward with injector effect into the main heat exchanger. At the roller 495 descends it slides along the side face 493c of the cam for a way without altering the position of the cam lever 493, but near the end of the power stroke the roller forces the lever to swing rapidly in a counterclockwise direction which causes the T-shaped lever to swing clockwise. The load spring is slightly compressed as the three knife edges come into alignment, but as this position of alignment is passed, the force of spring 489 effects a snap action movement of the T-lever to rapidly complete its clockwise swing.

At the beginning of this clockwise movement of the T-shaped lever the inlet valve 469 is not immediately closed because the pivoted arm 479c of the T-shaped lever is still held against the push rod 473 of the inlet valve by a latch 499 pivotally mounted at 501 on the side frame member 487. This latch continues to hold the pivoted arm 479c of the T-shaped lever against the inlet valve push rod, as seen in Fig. 32, until the lever begins its snap action movement to effect opening of the air exhaust valve. During this rapid snap action, the inlet valve is closed and the exhaust valve is opened, as seen in Fig. 34.

At the end of the power or oxygen injection stroke the roller 495 will have reached the lowermost dwell of the cam, as shown in Fig. 34, and the cam lever 493 will be at its limit of swing in the counterclockwise direction. The exhaust valve is open and the springs about the oxygen cylinder are effective to cause the oxygen plunger and power piston to move upward through the return stroke. The rate of this return or exhaust stroke can be controlled by the setting of the exhaust regulating valve 443 as already described. The roller 495 rides up the now vertically disposed left side 493d of the cam, as shown in Fig. 35, causing no change in position of the cam lever until near the upper end of the exhaust stroke when the roller engages the upper slanting surface 493e of the cam. As the roller continues upward the cam lever is swung clockwise and simultaneously the T-shaped lever is swung counterclockwise. This withdraws the integral arm 479b from the exhaust valve push rod 471, thus allowing the exhaust valve 467 to close. As the spring rod 481 again shifts just past the position of alignment of the knife edges, the T-shaped valve lever 479 is snapped to its inlet valve opening position. In this counterclockwise movement of the T-shaped lever its pivoted arm 479c is in effect integral and is forced past the latch lever 499 causing the latter to overcome the force of a spring 503 behind its upper arm 499a. After a small lip 479c' on the pivoted arm 479c of the T-shaped lever passes a shoulder 499a' on the upper arm of the latch lever, this spring 503 will ordinarily force the shoulder under the lip. To insure this, however, the lower arm 499b of the latch lever is in the path of a lug 493f on the cam lever and as the latter reaches the end of its clockwise swing this lug will force the shoulder 499a' of the latch under lip 479c' on the pivoted arm of the T- shaped lever, if the shoulder is not already in that position. This completes the cycle of the moving parts and the power stroke immediately reoccurs.

The speed of the pump and consequently the amount of liquid oxygen injected into the heat exchanger is controlled by the exhaust regulating valve 443 at the top of the pump. By restricting the rate of escape of air from the power cylinder the return stroke of the pump is reduced and hence the time for a complete cycle of the pump operation is increased. By regulating the rapidity of the pump cycle the amount of liquid oxygen forced into the main heat exchanger is determined. And by controlling this amount the ultimate pressure of the gaseous oxygen can be made as desired.

In the heat exchanger the oxygen absorbs heat from the inflowing high pressure air, which is to be liquefied and subjected to distillation, and is transformed from the liquid state to the gaseous state. By choosing the number of heat exchange units making up the main heat exchanger, and selecting the most favorable paths of flow through it for the air, oxygen and effluent as previously explained, the gaseous oxygen can be delivered from the discharge end at room temperature. Thus by the combined effects of the pump and the heat exchanger the unit will produce without the use of the usual oxygen compressor gaseous oxygen of the desired purity at room temperature and at any desired pressure.

A feature of the pump that is noteworthy is the provision taken for keeping the oxygen end cold and preventing loss of refrigeration. The very cold effluent flows through the lower casing 319, bathing not only the oxygen valve block 353 and oxygen cylinder 351 but also all the adjacent parts in contact therewith. Thus, it might be said, all the metal of the oxygen end and of the pump is in a very cold atmosphere provided by the continuously flowing effluent. The block 317 between the air and oxygen ends is made of highly heat-resisting material, so that it not only greatly restricts the escape of refrigeration from the oxygen end but likewise bars the flow of heat from the air end. Such refrigeration as does escape to the air end just beyond the block is for the most part recaptured by the air in the coiled tube $t'$ about the lower end of the upper casing 315 and since this air is led into the main heat exchanger the net loss of refrigeration is negligible.

The space in the container 1 around all the elements of the apparatus is tightly packed with a heat insulating material such as spun glass for example. This not only retains the refrigeration in the unit but also repels the inflow of heat from the atmosphere through the outside casing.

The net result of the numerous improvements is a highly efficient oxygen producing apparatus which is extremely compact and easily portable.

I claim:

1. Apparatus for producing high pressure gaseous oxygen comprising a main heat exchanger into which compressed air is introduced and through which the air flows in one direction, a rectifier column having at its bottom a boiler wherein the air flowing from the main heat exchanger is liquefied, a second heat exhanger beyond the boiler in the direction of flow of said air in which the temperature of said liquid air is further reduced, means for the expansion of said liquid air for delivery into the rectifier column for downward flow therein for purposes of rectification and for the formation of liquid oxygen in the said boiler while the effluent formed in the rectification flows upward in said column, a third heat exchanger for cooling said liquid oxygen, and a pump for increasing the pressure of said liquid oxygen to a desired pressure; the said high pressure liquid oxygen passing from said pump through the main heat exchanger in a direction counter to that of the compressed air whereby the air is cooled and the liquid oxygen is heated to a desired temperature for discharge from the apparatus; and the effluent passing from the rectifier column successively through the casing of said pump, the said third heat exchanger, the said second heat exchanger and the said main heat exchanger.

2. Apparatus for producing high pressure oxygen from compressed air, compressing a casing containing a main heat exchanger through which the compressed air flows to be cooled, a rectifier column having a boiler in which said cooled compressed air is liquefied, a sub-cooler through which the liquefied air flows and is further cooled, an expansion valve for reducing the pressure of said sub-cooled liquid air for its admission to the said rectifier column wherein liquid oxygen is collected in said boiler and the effluent from the rectification passes upward in said column, a second sub-cooler for receiving liquefied oxygen from said boiler and further cooling said liquefied oxygen, and a pump for receiving the said further cooled liquid oxygen and increasing its pressure to that desired; the said liquid oxygen passing from said pump through the said main heat exchanger wherein it is transformed into gaseous oxygen for delivery at the desired high pressure and the effluent from said rectifier column passing through the pump and the said second sub-cooler to absorb heat from the liquid oxygen and passing subsequently through the first mentioned sub-cooler and the main heat exchanger to absorb heat from the air.

3. Apparatus for producing high pressure gaseous oxygen comprising a main heat exchanger into which compressed air is introduced and through which the air flows in one direction, a rectifier column having at its bottom a boiler wherein the air flowing from the main heat exchanger is rectified, a mass of adsorbent material through which the air flows on its way from said main heat exchanger to said rectifier column, a second heat exchanger beyond the boiler in the direction of flow of said air in which the temperature of said liquid air is further reduced, means for the expansion of said liquid air for delivery into the rectifier column for downward flow therein for purposes of rectification and for the formation of liquid oxygen in the said boiler while the effluent formed in the rectification flows upward in said column, a third heat exchanger for cooling said liquid oxygen, and a pump for increasing the pressure of said liquid oxygen to a desired pressure; the said high pressure liquid oxygen passing from said pump through the main heat exchanger in a direction counter to that of the compressed air whereby the air is cooled and the liquid oxygen is heated to a desired temperature for discharge from the apparatus; and the effluent passing from the rectifier column successively through the casing of said pump, the said third heat exchanger, the said second heat exchanger and the said main heat exchanger.

4. Apparatus for producing high pressure, gaseous oxygen comprising a main heat exchanger into which compressed air is introduced and through which the air flows in one direction, a rectifier column having at its bottom a boiler wherein the air flowing from the main heat exchanger is liquefied; a second heat exchanger beyond the boiler in the direction of flow of said air in which the temperature of said liquid air is further reduced, means for the expansion of said liquid air for delivery into the rectifier column for downward flow therein for purposes of rectification and for the formation of liquid oxygen in the said boiler while the effluent formed in the rectification flows upward in said column, a charcoal trap arranged to receive said liquid air on its way to said means for the expansion of said liquid air, a third heat exchanger for cooling said liquid oxygen, and a pump for increasing the pressure of said liquid oxygen to a desired pressure; the said high pressure liquid oxygen passing from said pump through the main heat exchanger in a direction counter to that of the compressed air whereby the air is cooled and the liquid oxygen is heated to a desired temperature for discharge from the apparatus; and the effluent passing from the rectifier column successively through the casing of said pump, the said third heat exchanger, the said second heat exchanger and the said main heat exchanger.

5. Apparatus for producing oxygen from compressed air comprising a main heat exchanger through which the compressed air flows to be cooled, a boiler through which the said cooled air flows and is liquefied, an expansion valve for reducing the pressure of said liquefied air and maintaining the desired reduced pressure, a rectifying column for receiving said liquefied air at said desired reduced pressure and effecting its separation into liquid oxygen and other components, means for removing carbonaceous material interposed between said main heat exchanger and said rectifying column through which said air passes on its way to said rectifying column, means for increasing the pressure of the liquid oxygen, means conducting the liquid oxygen at said increased pressure to the main heat exchanger for flow therethrough in a direction counter to that of the compressed air whereby the liquid oxygen becomes gaseous oxygen at the said increased pressure.

6. Apparatus for producing oxygen from compressed air comprising a main heat exchanger through which the compressed air flows to be cooled, a boiler through which the said cooled air flows and is liquefied, an expansion valve for reducing the pressure of said liquefied air and maintaining the desired reduced pressure, a rectifying column for receiving said liquefied air at said desired reduced pressure and effecting its separation into liquid oxygen and other components, a charcoal trap arranged to receive said liquefied air from said boiler on its way to said expansion valve, means for increasing the pressure of the liquid oxygen, means conducting the liquid oxygen at said increased pressure to the main heat exchanger for flow therethrough in a direction counter to that of the compressed air whereby the liquid oxygen becomes gaseous oxygen at the said increased pressure.

7. In a process of producing oxygen and delivering the same under pressure in which cooled air is rectified at a relatively low temperature and reduced pressure to produce a cold nitrogen product and a liquid oxygen product having a temperature corresponding to its boiling point at said reduced pressure; the steps comprising subcooling such oxygen product by heat exchange with a colder fluid derived from said rectification; filtering the sub-cooled liquid oxygen to remove particles of dangerous impurities including impurities rendered filterable by said sub-cooling; pumping such sub-cooled liquid oxygen product to a desired substantially higher pressure; and delivering the pumped oxygen to receiving means at the higher pressure.

8. In a process of producing oxygen and delivering the same under pressure in which cooled air is rectified at a relatively low temperature and reduced pressure to produce a cold nitrogen product and a liquid oxygen product having a temperature corresponding to its boiling point at said reduced pressure; the steps comprising sub-cooling such oxygen product by heat exchange with a colder fluid drawn from said rectification; filtering the sub-cooled liquid to remove impurities including those rendered filterable by said sub-cooling; pumping such sub-cooled liquid oxygen product to a desired substantially higher pressure; heating the pumped liquid oxygen by heat exchange with incoming compressed air to absorb heat therefrom and superheat the oxygen; and delivering the resulting warmed and dry oxygen to receiving means at said higher pressure.

9. In a process of producing oxygen and delivering the same under pressure in which cooled air is rectified at a relatively low temperature and reduced pressure to produce a cold nitrogen product and a liquid oxygen product, the steps comprising filtering said liquid oxygen product to remove particles of dangerous impurities; pumping such filtered liquid oxygen product to a desired substantially higher pressure; heating the pumped liquid oxygen by heat exchange with incoming compressed air to absorb heat therefrom and superheat the oxygen; and delivering the resulting warmed and dry oxygen to receiving means at said higher pressure.

10. In a process of producing oxygen and delivering the same under pressure in which cooled air is rectified at a relatively low temperature and reduced pressure to produce a cold nitrogen product and a liquid oxygen product having a temperature corresponding to its boiling point at said reduced pressure; the steps comprising subcooling such oxygen product by heat exchange with a colder fluid drawn from said rectification; filtering the sub-cooled oxygen product to remove particles of dangerous impurities; pumping such sub-cooled liquid oxygen product to a desired substantially higher pressure by a pumping device having a reciprocating pumping element; heating the pumped liquid oxygen by heat exchange with incoming compressed air to absorb heat therefrom and superheat the oxygen; and delivering the resulting warmed and dry oxygen to receiving means at said higher pressure.

11. In apparatus for producing oxygen from air and delivering the same at a desired pressure; the combination with means for cooling, expanding and rectifying compressed air including a main countercurrent heat exchanger and a rectifying column constructed and arranged for producing a nitrogen product and a liquid oxygen product; of a heat-exchange device comprising passages in heat-exchanging relation, one of which is connected to pass fluid from the rectifying column that is colder than said oxygen and the other of which is connected to receive and cool such oxygen product to provide sub-cooled liquid oxygen; a pump connected to said heat-exchange device to receive such liquid oxygen for raising the pressure of the liquid to a desired value; a filter interposed in the connection between said pump and the heat-exchange device for removing particles of dangerous impurities before they reach the pump; a heat-exchange passage connected to the discharge of said pump and associated with said main heat exchanger for conducting the pumped liquid from said pump in heat-exchange relation with incoming compressed air; and means for delivering the resulting warmed and dry oxygen from said passage to receiving means.

12. In apparatus for producing oxygen from air and delivering the same at a desired pressure, the combination with means for cooling, expanding, and rectifying compressed air including a main countercurrent heat exchanger and a rectifying column constructed and arranged for producing a nitrogen product and an oxygen product, of a heat-exchange device comprising passages in heat exchange relation, one of which is connected to pass a fluid from the rectifying column that is colder than said oxygen and the other of which is connected to receive and cool such oxygen product to provide sub-cooled liquid oxygen; a pump connected to said heat-exchange device to receive such sub-cooled liquid oxygen and raise the pressure of the liquid to a desired value; a filter interposed in the connection between said heat-exchange device and said pump for removing particles of dangerous impurities from the liquid oxygen including those rendered filterable by the sub-cooling before entering the pump; and means for delivering the pumped oxygen from said pump at the desired pressure.

13. In apparatus for producing oxygen from air and delivering the same at a desired pressure, the combination with means for cooling, expanding, and rectifying compressed air including a main countercurrent heat exchanger and a rectifying column constructed and arranged for producing a nitrogen product and an oxygen product, of a heat-exchange device comprising passages in heat exchanging relation, one of which is connected to pass a fluid from the rectifying column that is colder than said oxygen and the other of which is connected to receive and cool such oxygen product to provide sub-cooled liquid oxygen; a pump connected to said heat-exchange device to receive such sub-cooled liquid oxygen and raise the pressure of the liquid to a desired value; said pump being of the reciprocating type and having a packing through which a portion of the reciprocating element of the pump passes; and means for delivering the pumped oxygen at the desired pressure.

14. In a process for producing oxygen by the low temperature rectification of air which has been freed of a major part of its impurities prior to the final separation of a nitrogen product and a cold oxygen product; the steps comprising cooling the oxygen product by heat-exchange with a colder fluid drawn from said rectification to form substantially sub-cooled liquid oxygen; then filtering such liquid oxygen to remove additional impurities including those rendered filterable by said sub-cooling.

15. In an apparatus for producing oxygen by low temperature air separation including a rectifying column for producing a nitrogen product and a cold oxygen product, a heat-exchanger constructed and arranged for cooling the oxygen product by heat-exchange with the colder nitrogen product to a degree sufficient to form sub-cooled liquid oxygen; and a filter device connected to said heat-exchanger to receive the sub-cooled liquid and filter therefrom particles of impurities including those rendered filterable by said subcooling before passage of the filtered oxygen to receiving means.

16. A method of transferring a liquefied gas containing impurities from a source of such gas to a receiving means therefor at a pressure higher than the pressure of said source, which method comprises sub-cooling the liquefied gas being transferred by removing heat therefrom at least equivalent to the heat added thereto during a subsequent pumping step and at least sufficient to prevent detrimental flashing into vapor of the liquefied gas while being pumped; filtering the sub-cooled liquefied gas to remove therefrom impurities including those rendered filterable by said sub-cooling; and pumping the sub-cooled and filtered liquefied gas to said receiving means against the pressure therein.

FREDERICK G. KEYES.

References Cited in the file of this patent

UNITED STATES PATENTS

| Number | Name | Date |
|---|---|---|
| Re. 14,970 | Steffins | Oct. 26, 1920 |
| 1,565,884 | Aikman | Dec. 15, 1925 |
| 1,891,125 | Gessel | Dec. 13, 1932 |
| 1,976,388 | Eichelman | Oct. 9, 1934 |
| 2,154,901 | Hulse et al. | Apr. 18, 1939 |
| 2,209,296 | Jewel | July 23, 1940 |
| 2,256,421 | Borchardt | Sept. 16, 1941 |
| 2,333,712 | Eckey | Nov. 9, 1943 |
| 2,337,474 | Kornemann et al. | Dec. 21, 1943 |
| 2,386,297 | Dennis | Oct. 9, 1945 |
| 2,413,360 | Maguire | Dec. 31, 1946 |
| 2,460,859 | Trumpler | Feb. 8, 1949 |
| 2,464,891 | Rice | Mar. 22, 1949 |
| 2,480,094 | Anderson | Aug. 23, 1949 |
| 2,503,939 | De Baufre | Apr. 11, 1950 |
| 2,541,409 | Cornelius | Feb. 13, 1951 |

FOREIGN PATENTS

| Number | Country | Date |
|---|---|---|
| 10,722 | Great Britain | 1900 |
| 469,939 | Great Britain | Aug. 3, 1937 |